US012430094B2

(12) United States Patent
Chundi et al.

(10) Patent No.: US 12,430,094 B2
(45) Date of Patent: Sep. 30, 2025

(54) SYSTEMS AND METHODS FOR CUSTOMIZING MEDIA PLAYER PLAYBACK SPEED

(71) Applicant: Adeia Guides Inc., San Jose, CA (US)

(72) Inventors: Charishma Chundi, Andhra Pradesh (IN); Reda Harb, Bellevue, WA (US); Rajendra Pandey, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/493,924

(22) Filed: Oct. 5, 2021

(65) Prior Publication Data

US 2023/0103596 A1 Apr. 6, 2023

(51) Int. Cl.

| | |
|---|---|
| *G06F 3/16* | (2006.01) |
| *G06F 3/0481* | (2022.01) |
| *G06F 3/0482* | (2013.01) |
| *G06F 3/0484* | (2022.01) |
| *G06F 3/04842* | (2022.01) |
| *G06F 9/451* | (2018.01) |
| *H04M 1/72451* | (2021.01) |
| *H04N 21/231* | (2011.01) |
| *H04N 21/4402* | (2011.01) |

(Continued)

(52) U.S. Cl.
CPC ............ *G06F 3/165* (2013.01); *G06F 3/0481* (2013.01); *G06F 3/0482* (2013.01); *G06F 3/0484* (2013.01); *G06F 3/04842* (2013.01); *G06F 9/451* (2018.02); *H04M 1/72451* (2021.01); *H04N 21/23106* (2013.01); *H04N 21/440281* (2013.01); *H04N 21/4532* (2013.01); *H04N 21/47217* (2013.01)

(58) Field of Classification Search
CPC ...... G06F 3/165; G06F 3/0481; G06F 3/0484; G06F 3/0488; G06F 9/451; G06F 3/04842; G06F 3/04883; G06F 3/0482; H04N 21/23106; H04N 21/4532; H04N 21/47217; H04N 21/440281; H04M 1/72442; H04M 1/72451
See application file for complete search history.

(56) References Cited

U.S. PATENT DOCUMENTS

| | | | |
|---|---|---|---|
| 6,374,225 B1 | 4/2002 | Hejna | |
| 7,237,254 B1 * | 6/2007 | Omoigui | ............ H04N 21/6587 348/E7.071 |

(Continued)

FOREIGN PATENT DOCUMENTS

JP 2006309824 A * 11/2006

*Primary Examiner* — Irete F Ehichioya
*Assistant Examiner* — Phoebe X Pan
(74) *Attorney, Agent, or Firm* — HALEY GUILIANO LLP

(57) ABSTRACT

Systems and methods are provided for customizing the playback speed of a media player. One example method includes receiving a media content item and identifying a playback speed for at least a portion of the media content item. An adjustable playback speed user interface element is generated for display, wherein the user interface element is preset to the identified playback speed. The playback speed user interface element is adjustable in that at least a portion of the playback speed user interface element is movable from a first position to a second position. An interaction with the adjustable playback speed user interface element is identified and the portion of the media content item is generated for output at the identified playback speed.

17 Claims, 14 Drawing Sheets

(51) Int. Cl.
*H04N 21/45* (2011.01)
*H04N 21/472* (2011.01)

(56) References Cited

U.S. PATENT DOCUMENTS

| | | | |
|---|---|---|---|
| 7,359,981 B2* | 4/2008 | Horiuchi | H04L 65/1104 |
| | | | 725/86 |
| 7,720,552 B1* | 5/2010 | Lloyd | G06F 3/04847 |
| | | | 345/184 |
| 8,849,948 B2 | 9/2014 | Gilson | |
| 10,949,457 B2* | 3/2021 | DeLuca | H04W 4/70 |
| 11,017,811 B1* | 5/2021 | Li | G11B 27/28 |
| 2003/0194210 A1* | 10/2003 | Shiiyama | H04N 5/783 |
| | | | 386/E5.052 |
| 2004/0064576 A1* | 4/2004 | Goldhor | G10L 21/04 |
| | | | 704/E21.017 |
| 2004/0267952 A1* | 12/2004 | He | H04L 65/80 |
| | | | 709/231 |
| 2006/0036783 A1* | 2/2006 | Aarts | H04N 21/4532 |
| | | | 386/E5.052 |
| 2008/0155413 A1* | 6/2008 | Ubillos | G06F 3/04847 |
| | | | 715/716 |
| 2009/0175590 A1* | 7/2009 | Ryu | H04N 21/6125 |
| | | | 386/343 |
| 2009/0282362 A1* | 11/2009 | Matsumoto | G06F 3/04855 |
| | | | 715/834 |
| 2011/0142428 A1* | 6/2011 | Stenberg | H04N 21/472 |
| | | | 345/173 |
| 2011/0185312 A1* | 7/2011 | Lanier | H04N 21/6125 |
| | | | 715/810 |
| 2012/0218293 A1* | 8/2012 | Yamasaki | G06F 3/0483 |
| | | | 345/629 |
| 2013/0031266 A1* | 1/2013 | Gilson | H04N 21/2387 |
| | | | 709/232 |
| 2013/0071095 A1* | 3/2013 | Chauvier | H04N 21/6587 |
| | | | 386/343 |
| 2014/0210801 A1* | 7/2014 | Li | G09G 5/37 |
| | | | 345/204 |
| 2015/0012857 A1* | 1/2015 | Tang | G06F 3/04847 |
| | | | 715/768 |
| 2015/0195627 A1* | 7/2015 | Basso | H04N 21/44222 |
| | | | 725/32 |
| 2015/0304692 A1* | 10/2015 | Gavade | H04N 21/2387 |
| | | | 725/44 |
| 2015/0350709 A1* | 12/2015 | Tomita | H04N 21/462 |
| | | | 725/32 |
| 2017/0238026 A1* | 8/2017 | Agrawal | H04N 21/25883 |
| | | | 725/14 |
| 2018/0350388 A1* | 12/2018 | Jain | G11B 27/005 |
| 2019/0268632 A1* | 8/2019 | Foerster | H04N 21/6543 |
| 2020/0043511 A1* | 2/2020 | Raikar | G10L 21/055 |
| 2020/0183575 A1* | 6/2020 | Lee | G06F 3/04847 |
| 2020/0382723 A1* | 12/2020 | Pena | G11B 27/005 |
| 2022/0272284 A1* | 8/2022 | Chandrashekar | H04N 21/4884 |
| 2022/0312079 A1* | 9/2022 | Chandrashekar | H04N 21/45457 |

* cited by examiner

SYSTEMS AND METHODS FOR CUSTOMIZING MEDIA PLAYER PLAYBACK SPEED

BACKGROUND

The present disclosure is directed towards systems and methods for customizing the playback speed of a media player. In particular, systems and methods are provided herein that enable the identification of a playback speed for a media content item and the subsequent generation of a user interface element that is preset to the identified playback speed.

SUMMARY

The proliferation of media streaming platforms, such as YouTube, Netflix and Spotify, has enabled media content items to be delivered in ways that differ from traditional broadcasters. For example, if a user is consuming content, via the internet, through a media player running on a computing device, such as a smart television, smartphone or tablet, they tend to have more control over how the content is consumed when compared to a traditional broadcaster. A typical media player user interface comprises a relatively rigid preset set of elements, such as those for rewind and fast-forward. In some examples, a user consuming on-demand media content through such a media player may be faced with additional options (or user interface elements) that enable the user to pause, skip sections of the content, view a list of related episodes, rate the content, skip advertisements, select a video quality, select an audio quality and/or view subtitles. If the user interface of a media player only enables a user to interact with the relatively rigid fast-forward and/or rewind user interface elements, then user interface input may cause the media player to skip through parts of a media content item that were not intend to be skipped, for example, the fast-forward user interface element may cause the media content item to skip forward by 10 seconds, where a user only wanted to skip forward by 7 seconds. The user may then select the rewind user interface element in an attempt to reach a desired point in the media content item. Using the media player in this manner will cause additional user interface requests to rewind and/or fast-forward, which will waste network bandwidth and/or consume additional processing resources.

To overcome these problems, systems and methods are provided herein that are capable of customizing the user interface and the playback speed of a media player. More specifically, systems and methods are provided herein that enable the identification of a playback speed for a media content item and the subsequent generation of an improved user interface element that is preset to the identified playback speed.

Systems and methods are described herein for customizing the user interface and the playback speed of a media player. In accordance with an aspect of the disclosure, a method is provided for customizing the user interface and the playback speed of a media player. The method includes receiving a media content item and identifying a playback speed for at least a portion of the media content item. An adjustable playback speed user interface element is generated for display, wherein the user interface element is preset to the identified playback speed, and wherein the playback speed user interface element is adjustable in that at least a portion of the playback speed user interface element is movable from a first position to a second position. An interaction with the adjustable playback speed user interface element is identified, and the portion of the media content item at the identified playback speed is generated for output.

In an example system, a user accesses an over-the-top (OTT) media content provider, such as Amazon Prime, via an application running on the tablet device and selects a media content item to be streamed and displayed. A playback speed for at least a portion of the media content item is identified. In some examples, this may take place at a server remote from the tablet device. In other examples, this may take place at the tablet device. For example, an application running on a server may receive data indicating the playback speed that other users of the OTT service select, and the application running on the server may identify a suitable playback speed for at least the currently playing portion of the media content item based on this received data. The suitable playback speed may be transmitted to the tablet device at the same time, or nearly the same time, to the media content item. The playback speed may be any playback speed, such as 0.1, 0.4, 0.5, 0.75, 1.1, 1.3, 2.4, 5.6 or 10 times normal speed. On receiving the identification of the playback speed, an adjustable playback speed user interface element that is preset to the identified playback speed is generated for display, for example, 1.1 times normal speed. In some examples, the preset playback speed is visually indicated via a display of a computing device. The adjustable playback speed user interface element may be part of a user interface of the OTT application running on the tablet device. A user may interact with the adjustable playback speed user interface element via any known suitable method, such as a touch event, a connected keyboard and/or mouse and/or a voice command. Adjusting the adjustable playback speed user interface element may comprise moving a portion of the adjustable playback speed user interface element from a first position to a second position. On receiving a user interaction with the adjustable playback speed element, the user interaction is identified at the tablet device, for example, a touch event is registered at the tablet device. The user interaction may be a single click and/or a single touch event. The media content item is output at the tablet device at the identified playback speed.

In an example, the interaction with the adjustable playback speed user interface element may comprise a single click or single touch. In another example, a user profile may be identified, and the playback speed may be based on the user profile. A manifest file comprising the identified playback speed may be generated, wherein the manifest file indicates a plurality of media content item segments. The manifest file may be received, and the adjustable playback speed user interface element may be generated for display, wherein the preset playback speed is based on the manifest file playback speed. In some examples, the manifest file may comprise instructions that enable the playback speed to be preset (or adjusted) to different values for different portions of the media content item. In another example, a user profile and a recommended playback speed, based on the user profile, may be identified. Generating the adjustable playback speed user interface element may further comprise generating a recommended playback speed for display. In another example, identifying the indication with the playback speed user interface element may further comprise receiving a user input and extending a portion of the user interface element, in response to receiving the user input, in a direction away from an edge of the user interface element.

The portion may be a first portion and the media content item may further comprise a second portion. A second playback speed for the second portion of the media content item may be identified. The adjustable playback speed user interface element may be adjusted such that the user interface element is set to the identified second playback speed. A second interaction with the adjustable playback speed user interface element may be identified. The second portion of the media content item may be generated for output at the identified second playback speed. Continuing the above example, the media content item may comprise a first portion, for example directed toward mixing paints, that is suitable for playback at a first speed, for example 1.1 times normal speed, and a second portion, for example directed towards detailed bush strokes, that is suitable for playback at a second speed, for example 0.75 times normal speed. As the second portion is starting, or shortly before the second portion starts, the adjustable playback speed user interface element may be adjusted to indicate a playback speed of 0.75 times normal speed. In some examples, on receiving an indication from a user, for example a touch event at the tablet device, the second portion of the media content item may be generated for output at the identified second playback speed, i.e., 0.75 times normal speed in this example. In other examples, the second playback speed may be applied to the media content item automatically, i.e., without receiving an indication from the user. In some examples, the adjustable playback speed user interface element may be adjusted such that the user interface element is automatically set to the identified second playback speed, without any user input for requesting an adjustment via the user interface element.

The media content item may further comprise metadata indicating the content of the portion. A user profile may be identified, and the playback speed may be identified based on the metadata and the user profile. For example, the media content item may comprise metadata describing the media content item. The metadata may describe the media content item at a high level, for example that a specific episode that is being consumed is generally comedy or horror. In another example, the metadata may be deep scene metadata that describes a specific segment of the media content item in detail. For example, deep scene metadata may detail what is happening in a specific segment (or scene) of a media content item. If, for example, a user is viewing a cooking program, deep scene metadata may describe that something is being cooked and/or what is being cooked. A user profile may indicate that a user is interested in specific culinary dishes, for example, Nepalese dishes such as dal bhat. If the metadata indicates that a segment of a cooking program is showing how to cook dal bhat, then the identified playback speed may be a fraction, such as 0.6, of normal playback speed. This may enable the user to have more time to note down details of the recipe. The preset playback speed may change during the playback of a media content item based on a predicted user action, wherein the prediction may be based on the deep scene metadata of content, or a scene, of the media content item that is upcoming (for example, the last 10 mins in a movie, or an episode of a TV show).

A user profile and a first time period associated with the user profile may be identified. A second time period associated with the portion of the media content item may be identified. The first time period may be compared to the second time period and, if the second time period is longer than the first time period, a playback speed that enables the portion of the media content item to be output within the first time period may be identified. In an example system, the user profile may be connected to an online calendar service. An event in calendar may indicate that the user needs to be in a meeting at 10:00. In this example, the user starts watching a media content item at 9:45 that is identified to be 30 minutes long. So that the media content item finishes before the meeting, the identified playback speed is double that of the normal playback speed.

The media content item may be received at a first computing device, and a request to receive the media content item may be received at a second computing device. Identifying the playback speed may further comprise identifying the playback speed for the media content item at the second computing device, and generating the adjustable playback speed user interface may further comprise generating, for display, the adjustable playback speed user interface at the second computing device. Identifying an interaction with the adjustable playback speed user interface element may further comprise identifying the interaction at the second computing device. Generating the portion of the media content item at the identified playback speed may further comprise generating the portion of the media content item at the identified playback speed at the second computing device. A number of segments of the media content item may be identified to prefetch, and the identified number of segments of the media content item may be received at the first computing device. At least a portion of the received segments may be stored in a buffer at the first computing device. A notification that the indicated playback speed at the second computing device is greater than the playback speed at the first computing device may be received and, in response to receiving the notification, an increased number of segments of the media content item to prefetch may be identified. The increased number of segments of the media content item may be received at the first computing device. At least a portion of the received segments may be stored in the buffer at the first computing device. At least a portion of the stored segments may be transmitted from the first computing device to the second computing device.

In an example system, a media content item is consumed via an application at a smart television. However, as the media content item progresses, a first user may wish to consume the media content item at a different speed than a second user. The first user may open a corresponding application on their smartphone and indicated that they wish to consume the same media content item, but at a different playback speed. In this case, in a similar manner to that already described, a preset adjustable playback speed user interface element is generated for display, and a user interaction with the user element, such as a touch event, is identified. At the smartphone, at least a portion of the media content item is output at the identified playback speed. If the media content item is being streamed from the smart television to the smartphone and the identified playback speed at the smartphone is faster than at the smart television, then an additional buffer, or an increased buffer, may be utilized at the smart television, so that the media content can continue to be streamed from the smart television to the smart phone.

The media content item may comprise audio and visual components. Identifying an interaction with the adjustable playback speed user interface element may further comprise receiving a preset first interaction with the adjustable playback speed user interface element or receiving a preset second indication with the adjustable playback speed user interface element. On receiving the first interaction, the portion of the media content item may be generated for output at the identified playback speed, or, on receiving the second interaction, only the visual component of the media content item may be generated for output at the identified playback speed. In an example system, a user may indicate that they wish to consume a media content item at, for example, 1.8 times the normal playback speed with a swipe from left to right, in the region of the user interface element. The swipe may correspond to a preset indication that a user wishes to consume both video and audio elements of a media content item, in which case both the video and audio components of the media content item are generated for output. In another example, a user may indicate that they wish to consume a media content item at, for example, 1.8 times the normal playback speed with a single, static, touch event in the region of the user interface element. The touch event may correspond to a preset indication that a user wishes to consume only the video element of a media content item, in which case only the video element of the media content item is generated for output.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
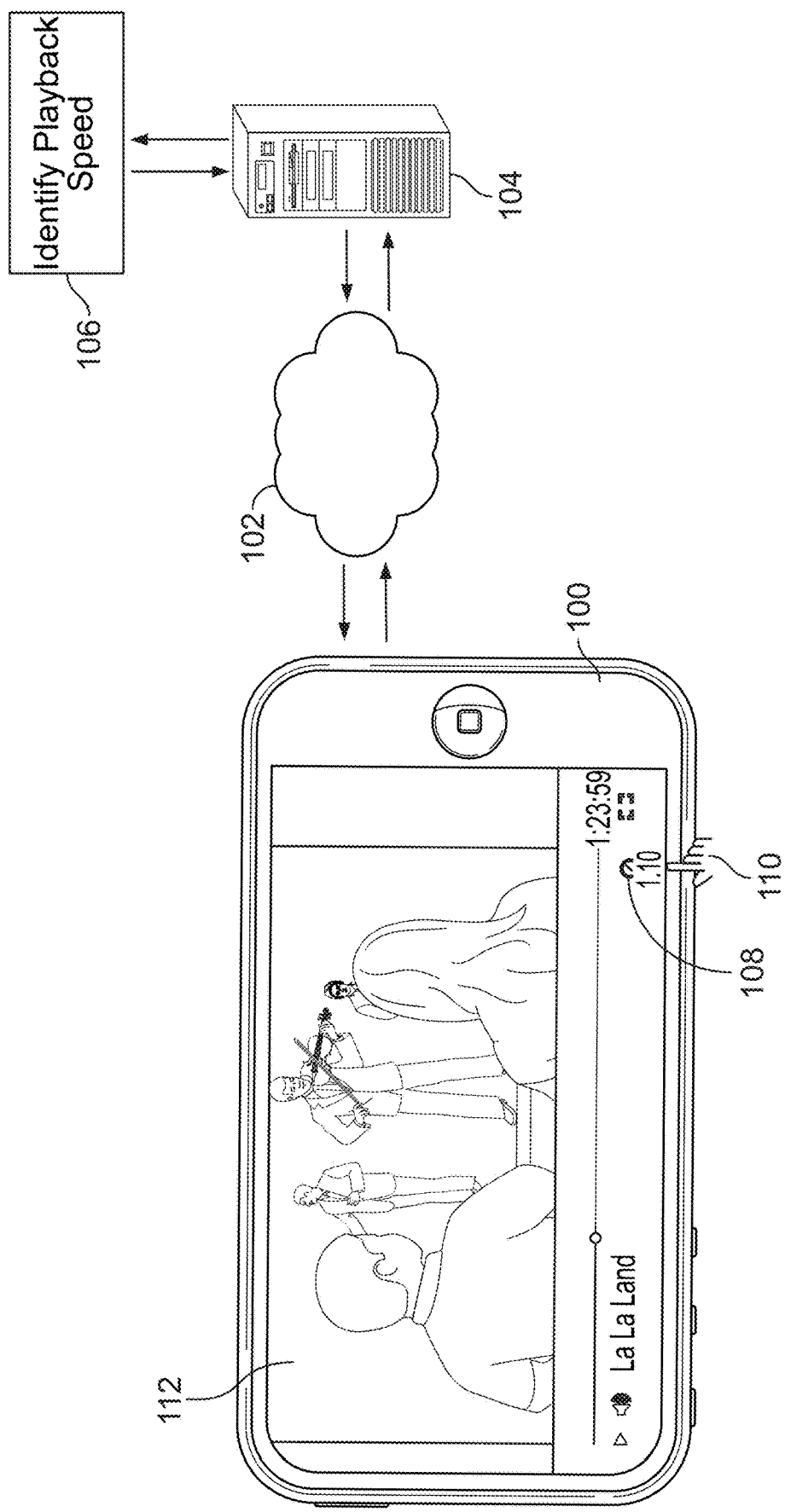
FIG. 1 shows an example environment in which the playback speed of a media player is customized, in accordance with some embodiments of the disclosure.

Systems and methods are described herein for customizing the playback speed and/or the user interface of a media player. A media content item may be stored at, for example, a server in a number of pre-generated, segmented, formats. An example of a pre-segmented standard for media content items is the MPEG DASH standard. Any known suitable segmented format may be used. In an example, a first format may correspond to a playback speed of 0.5 times normal playback speed. A second format may correspond to normal playback speed. A third format may correspond to 1.5 times playback speed, and a fourth format may correspond to 2 times playback speed. On receiving a segment of the media content item, the media player may generate the segment for output. As the segment has been preformatted, the segment is generated for output at the formatted playback speed. In such an example system, the adjustable playback speed user interface element may essentially cause the media player to request a preformatted segment in order to generate the segment for output. In another example, the media player may request a media content item in a format that corresponds to normal playback speed, and the media player, or an application running on the underlying computing device, may format the media content item in order to apply any preset playback speed. In another example, media content items may be stored at a server in a format that corresponds to a normal playback speed, and the server may format the media content item in order to deliver the media content item to a media player at a preset playback speed.

In any of the examples described herein, the media content item may automatically be generated for output, and output, at the preset playback speed.

Media content items include audio, video and/or any other media content. Audio includes audio-only content, such as podcasts, stories and music. Video includes audiovisual content such as movies and/or television programs. An OTT content and/or video sharing platform may be accessed via a website and/or an application running on a computing device and may receive any type of media content, including live media content and/or on-demand media content.

An adjustable playback speed user interface element is any suitable user interface element that is adjustable. For example, at least a portion of the playback speed user interface element is movable from a first position to a second position and can be used to indicate and select an identified playback speed. In another example, the adjustable playback speed user interface element is any suitable user interface element that may comprise a number that changes in response to an identified playback speed. In some examples, the functionality of the adjustable playback speed user interface element is any suitable user interface element that is adjustable, rather than (or in addition to) a visual element.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVR, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment in which the playback speed of a media player is customized, in accordance with some embodiments of the disclosure. The environment comprises a computing device, in this case a tablet 100, that receives a media content item via a network 102 from a server 104. The network 102 may be the internet and may comprise wired and/or wireless means for transmitting the media content from the server 104 to the tablet 100. In some examples, the server 104 is an edge server. In some examples, the tablet 100 runs an application of an OTT provider in order to generate the media content for output and to display the media content. If the computing device is, for example, a smart speaker, and the media content is audio-only media content, then generating the media content for output may comprise generating a signal that causes a speaker to output the audio content. A playback speed for the media content item is identified 106 at the server 104, for example, 1.10 times normal playback speed. In this example, the media content is delivered from the same server at which the playback speed is identified; however, the identification of the playback speed may be carried out at another server. This other server may be a different physical server, a different virtual machine running on the same physical server and/or a combination of the two. The identified playback speed is transmitted from the server 104, via the network 102, to the tablet 100. At the tablet 100, an adjustable playback speed user interface element 108 is generated for display and is displayed to the user. The adjustable playback speed user interface element 108 is preset in accordance with the identified playback speed, in this example, to 1.10 times normal playback speed. User input 110 is received, for example a touch event on the display of the tablet 100, that confirms the preset playback speed. In some examples, not shown, the media content item may be generated for output, and output, automatically without any user input. In some examples, the media content item may be received from the server in a format that enables the media content item to be played back at the identified speed. The media content item 112 is generated for output and is output at the identified playback speed. An advantage of this arrangement is that media content items can be streamed to computing devices at the identified playback speed. This may be beneficial for computing devices that have relatively low-powered processors, as the media content items do not need to be processed at the computing device to display the media content item at different playback speeds. In addition, we address the issues associated with a media player comprising a relatively rigid preset set of user interface elements by providing an adjustable user interface element that is adjustable to respond to an identified playback speed in a dynamic manner, as the media content item progresses.

Figure 2:
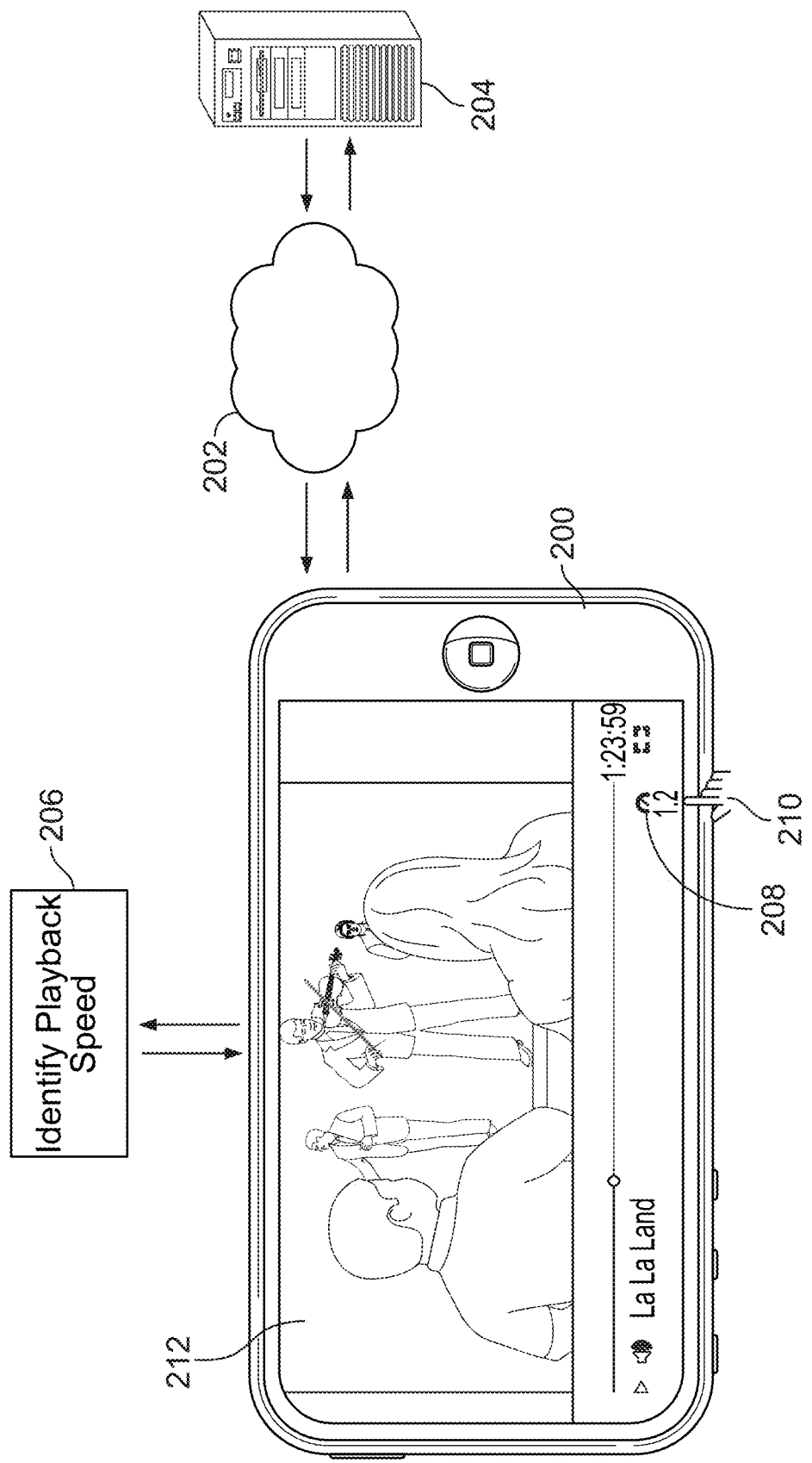
FIG. 2 shows another example environment in which the playback speed of a media player is customized, in accordance with some embodiments of the disclosure.

FIG. 2 shows another example environment in which the playback speed of a media player is customized, in accordance with some embodiments of the disclosure. In a similar manner to the environment shown in FIG. 1, the environment comprises a computing device, in this case a tablet 200, that receives a media content item via a network 202 from a server 204. However, in contrast to the environment shown in FIG. 1, the playback speed is identified 206 at the tablet 200. In this example, the playback speed is identified as 1.2 times normal playback speed. At the tablet 200, an adjustable playback speed user interface element 208 is generated for display and is displayed to the user. In some examples, the user interface element 208 may be the same element as the user interface element 108 shown in FIG. 1, in that it appears in the same position in an application running on the tablet 100, 200, but having been adjusted to have a different preset value. In other examples, the environment shown in FIG. 2 is a stand-alone environment. The adjustable playback speed user interface element 208 is preset in accordance with the identified playback speed, in this example, to 1.2 times normal playback speed. User input 210 is received that confirms the preset playback speed. In some examples, the media content item may be received from the server at a normal playback speed and may be processed at the tablet 200 to enable the media content item to be generated for output at the identified playback speed. The media content item 212 is generated for output and is output at the identified playback speed. An advantage of this arrangement is that the server 204 only needs to store one copy of the media content item for all playback speeds.

Figure 3:
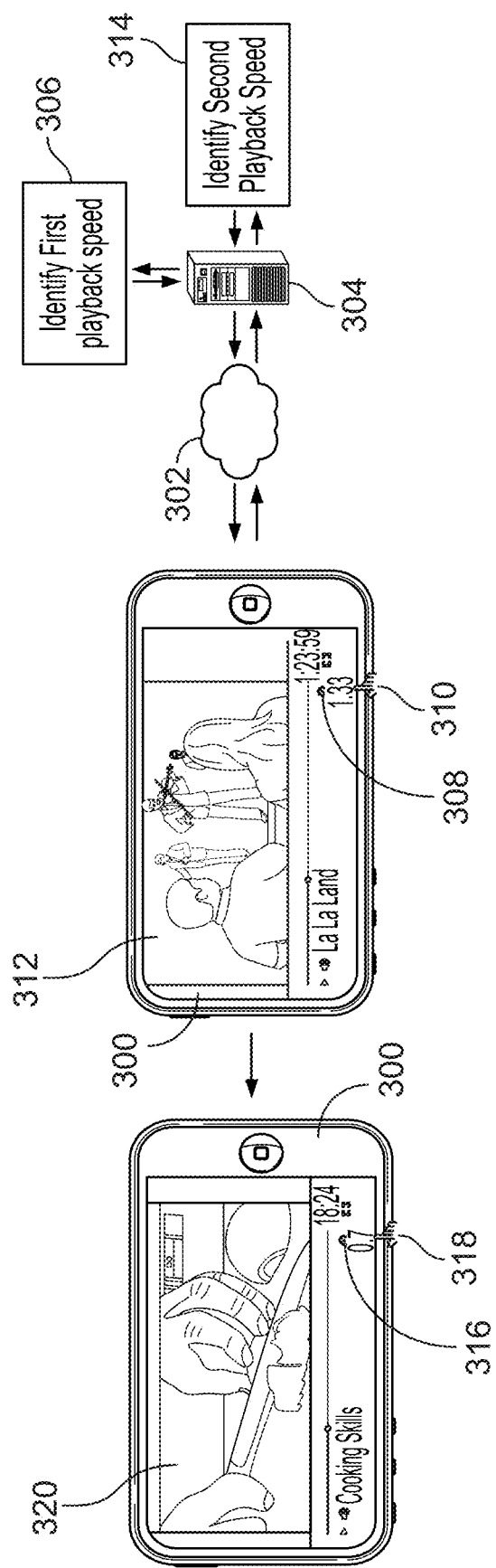
FIG. 3 shows another example environment in which the playback speed of a media player is customized, in accordance with some embodiments of the disclosure.

FIG. 3 shows another example environment in which the playback speed of a media player is customized, in accordance with some embodiments of the disclosure. In a similar manner to the environments shown in FIGS. 1 and 2, the environment comprises a computing device, in this case a tablet 300, that receives a media content item via a network 302 from a server 304. A first playback speed for a first portion of the media content item is identified 306 at the server 304, for example, 1.33 times normal playback speed. The first identified playback speed is transmitted from the server 304, via the network 302, to the tablet 300. At the tablet 300, an adjustable playback speed user interface element 308 is generated for display and is displayed to the user. The adjustable playback speed user interface element 308 is preset in accordance with the identified playback speed, in this example, to 1.33 times normal playback speed. In some examples, the user interface element 308 may be the same element as the user interface element 108, 208 shown in FIGS. 1 and 2, in that it appears in the same position in an application running on the tablet 100, 200, 300 but having been adjusted to have a different preset value. In other examples, the environment shown in FIG. 3 is a stand-alone environment. User input 310 is received that confirms the preset playback speed. The first portion of the media content item 312 is generated for output and is output at the identified playback speed. As the media content item progresses from the first portion to a second portion, a second playback speed 314 is identified at the server 304, for example, 0.7 times normal playback speed. This second playback speed may be identified based on an upcoming scene, for example, the second portion of the media content item may comprise a scene (or scenes) that includes detail that a user may wish to note down for later use, for example a recipe. This may be based on previous actions by a user, wherein they have manually slowed down the playback of portions of media content items comprising a recipe. In this example, generating the media content item for output at 0.7 times normal playback speed enables a user to note down the details of a recipe. The second identified playback speed is transmitted from the server 304, via the network 302, to the tablet 300. At the tablet 300, the adjustable playback speed user interface element 308 is adjusted in accordance with the identified second playback speed, in this example, to 0.7 times normal playback speed, is generated for output and is output at the tablet device. A second user input 318 is received that confirms the adjusted playback speed. The second portion of the media content item 320 is generated for output and is output at the identified second playback speed. The identified second playback speed may be communicated via a manifest file, as discussed in connection with FIG. 5 below. In another example, an application running on the tablet 300 may receive a series of timepoints with associated playback speeds for initialization purposes. For example, a data structure that maps a time point in a media content item to a playback speed may be used (e.g., 500 seconds: 1.25 times normal playback speed, 770 seconds: 1.5 times normal playback speed).

Figure 4:
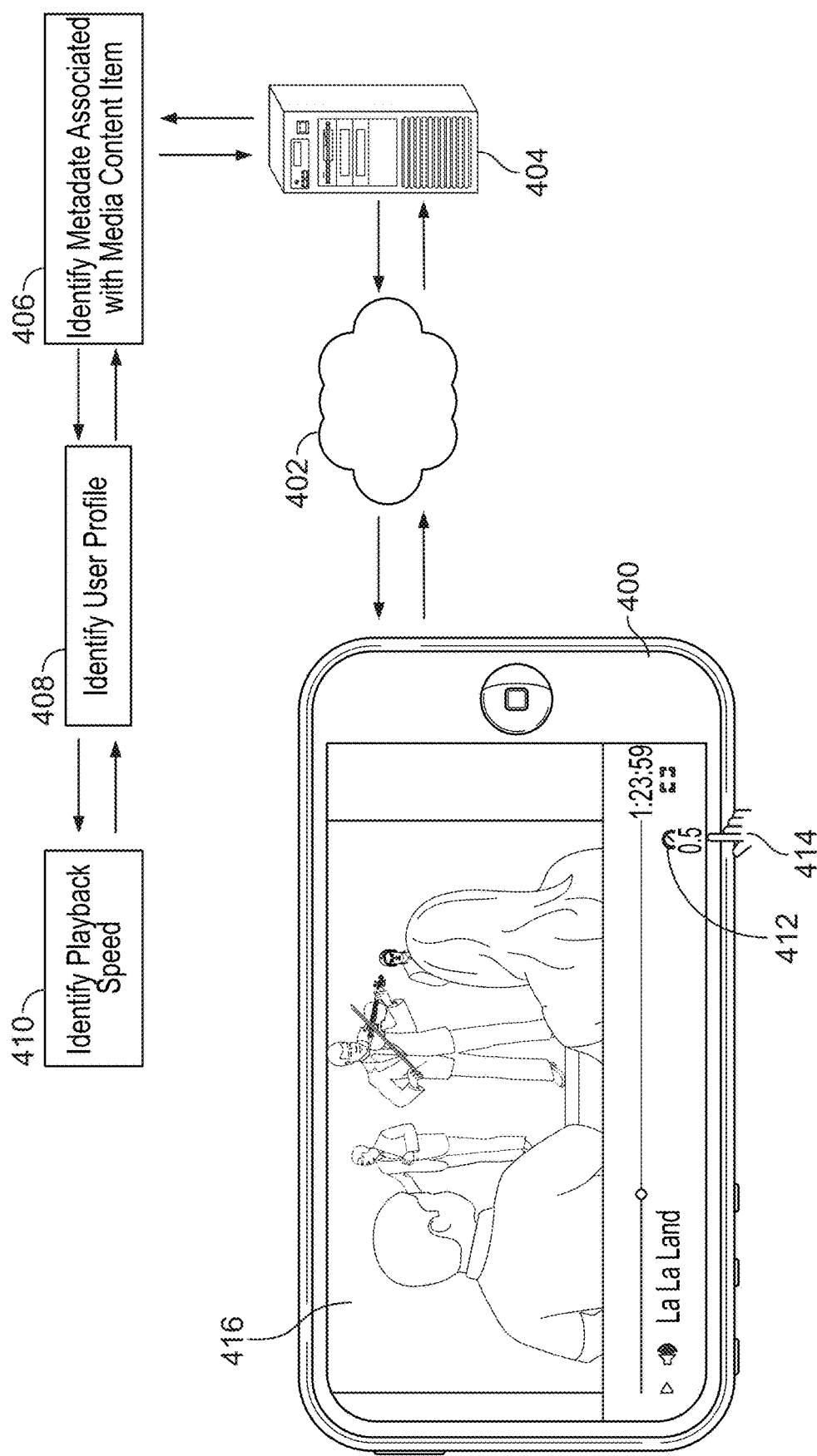
FIG. 4 shows another example environment in which the playback speed of a media player is customized, in accordance with some embodiments of the disclosure.

FIG. 4 shows another example environment in which the playback speed of a media player is customized, in accordance with some embodiments of the disclosure. In a similar manner to the environments shown in the previous figures, the environment comprises a computing device, in this case a tablet 400, that receives a media content item via a network 402 from a server 404. At the server 404, metadata associated with the media content item is identified 406. For example, the metadata may describe the media content item at a high level, for example that a specific episode that is being consumed is generally comedy or horror. In some examples, the media content item may comprise metadata describing the media content item. In this example, the metadata is deep metadata that indicates that a scene comprises violin playing. In another example, the metadata may be deep scene metadata that describes a specific segment of the media content item in detail. For example, deep scene metadata may detail what is happening in a specific segment (or scene) of a media content item. In another example, the media content item may not comprise metadata, and the metadata may be accessed via, for example, a database accessible via the internet. In another example, the metadata may be scraped from a webpage that is identified to be associated with the media content item. A user profile is identified 408. In this example, the user profile indicates that the user is interested in dancing and, in particular, the quickstep. A user profile may indicate any type of interest, for example that a user is interested in comedy, or that a user in interested in a certain musical instrument. In other examples, the user profile may be used to keep track of past user actions, for example, what playback speed the user usually selects for a certain type of content, and the playback speed may be identified based on the past user actions when watching similar content items. The user profile may be associated with an OTT account. In other examples, the user profile may be linked to a video sharing account, for example a Google account linked to YouTube. A playback speed is identified 410. In this example, as the metadata indicates a type of content that the user profile indicates that the viewer may be interested in, a playback speed of 0.5 times normal playback speed is identified. The identified playback speed is transmitted from the server 404, via the network 402, to the tablet 400. At the tablet 400, an adjustable playback speed user interface element 412 is generated for display and is displayed to the user. The adjustable playback speed user interface element 412 is preset in accordance with the identified playback speed, in this example, to 0.5 times normal playback speed. In some examples, the user interface element 412 may be the same element as the user interface element 108, 208, 308 shown in FIGS. 1-3, in that it appears in the same position in an application running on the tablet 100, 200, 300, 400 but having been adjusted to have a different preset value. This preset value may additionally be based on any combination of the aforementioned features. In other examples, the environment shown in FIG. 4 is a stand-alone environment. User input 414 is received that confirms the preset playback speed. The media content item 416 is generated for output and is output at the identified playback speed.

Figure 5:
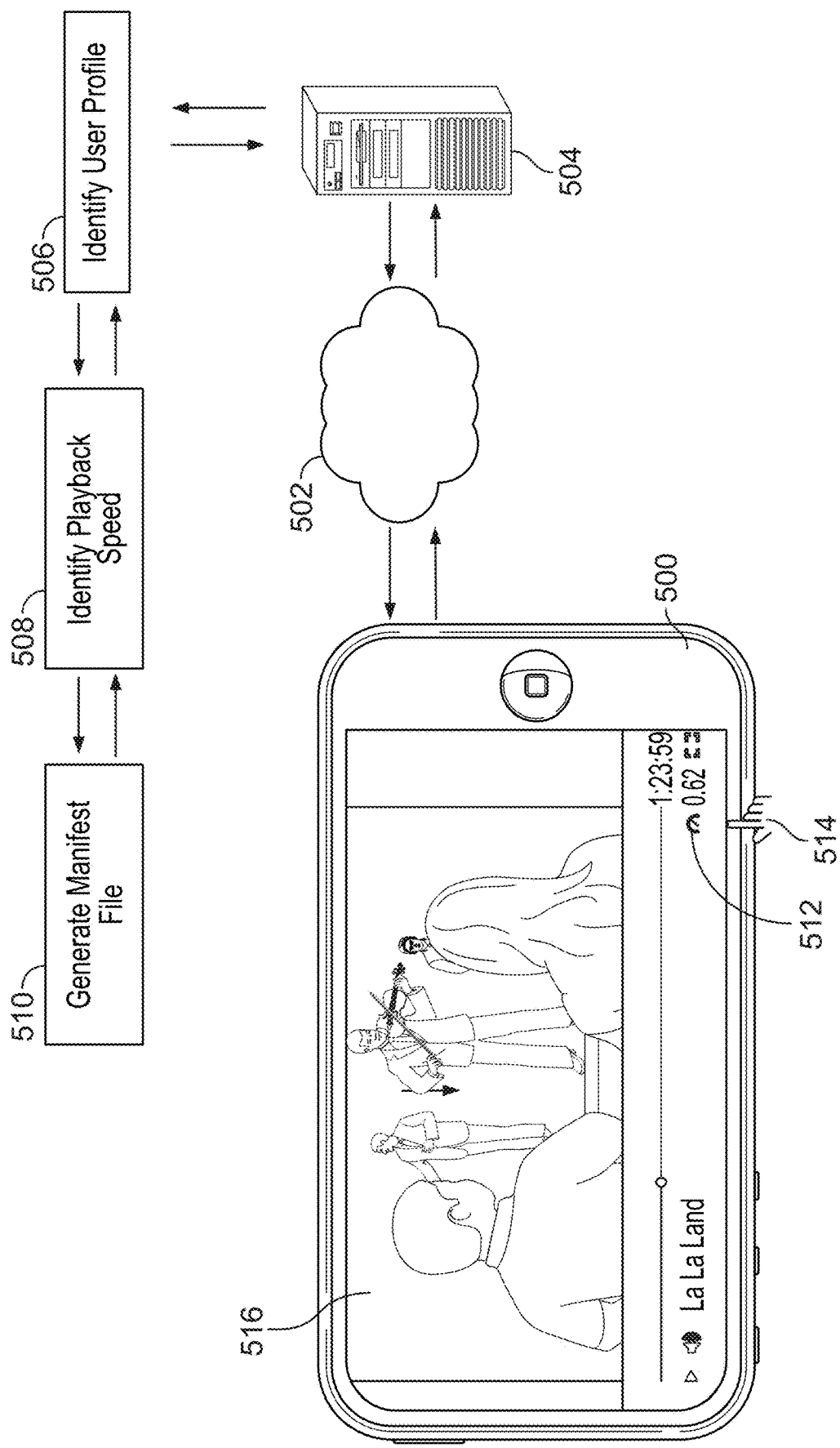
FIG. 5 shows another example environment in which the playback speed of a media player is customized, in accordance with some embodiments of the disclosure.

FIG. 5 shows another example environment in which the playback speed of a media player is customized, in accordance with some embodiments of the disclosure. In a similar manner to the environments shown in the previous figures, the environment comprises a computing device, in this case a tablet 500, that receives a media content item via a network 502 from a server 504. At the server 504, a user profile is identified 506. As discussed in connection with FIG. 4, a playback speed is identified 508 based on the identified user profile. In this example, a playback speed of 0.62 times normal playback speed is identified and a manifest file, comprising the identified playback speed, is generated 510. See Table 1 for an exemplary pseudo-manifest file data structure.

TABLE 1

| Segment no. | Segment Time | Quality | Segment Address | Identified Speed |
|---|---|---|---|---|
| 1-1 | 00:00-1:30 | 360p | http://example.eom/1/1-1 | 0.90 |
| 1-2 | 00:00-1:30 | 720p | http://example.eom/1/1-2 | 0.62 |
| 2-1 | 1:31-2:45 | 360p | http://example.eom/1/2-1 | 1.5 |
| 2-2 | 1:31-2:45 | 720p | http://example.eom/1/2-2 | 1.3 |
| 3-1 | 2:46-3:15 | 360p | http://example.eom/1/3-1 | 0.3 |
| 3-2 | 2:46-3:15 | 720p | http://example.eom/1/3-2 | 0.1 |

The manifest file is transmitted from the server 504, via the network 502, to the tablet 500. At the tablet 500, the manifest file is received and, based on the contents of the manifest file, an adjustable playback speed user interface element 512 is generated for display and is displayed to the user. In other examples, any other data structure, such as a JavaScript Object Notation (JSON) file, can be used. The adjustable playback speed user interface element 512 is preset in accordance with the identified playback speed, in this example, to 0.62 times normal playback speed. In some examples, the user interface element 512 may be the same element as the user interface element 108, 208, 308, 412 shown in FIGS. 1-4, in that it appears in the same position in an application running on the tablet 100, 200, 300, 400, 500 but having been adjusted to have a different preset value. This preset value may additionally be based on any combination of the aforementioned features. In other examples, the environment shown in FIG. 5 is a stand-alone environment. User input 514 is received that confirms the preset playback speed. The media content item 516 is generated for output and is output at the identified playback speed. In some examples, the manifest file comprises data indicating segments based on both quality and identified playback speed. In some examples, the identified playback speed may be identified based on the quality of the segment (and, optionally, in addition to the other examples described herein). For example, a high definition segment may have a slower identified playback speed and a standard definition segment may have a higher identified playback speed. This may take into account media content items that appear visually more aesthetic when being slowed down in high definition, as opposed to standard definition media content items that might, for example, show more obvious compression artifacts when the playback speed is slowed down.

If, for example, a user normally starts playing a certain genre of media content item (including, for example, a certain TV series) at a speed that is different than the normal speed (for example, 1.25 times normal playback speed), then, if the user subsequently selects a media content item having the same genre (including, for example, a subsequent episode of a TV series), the playback may also start at the usual playback speed automatically, and without the user having to adjust the playback speed. A media player running on a computing device may receive user preferences in a manifest file where, for example, playback preferences may be integrated or added on the fly. In some examples, a personalization service may communicate any such preferences via any other suitable data structure, such as JSON.

Figure 6:
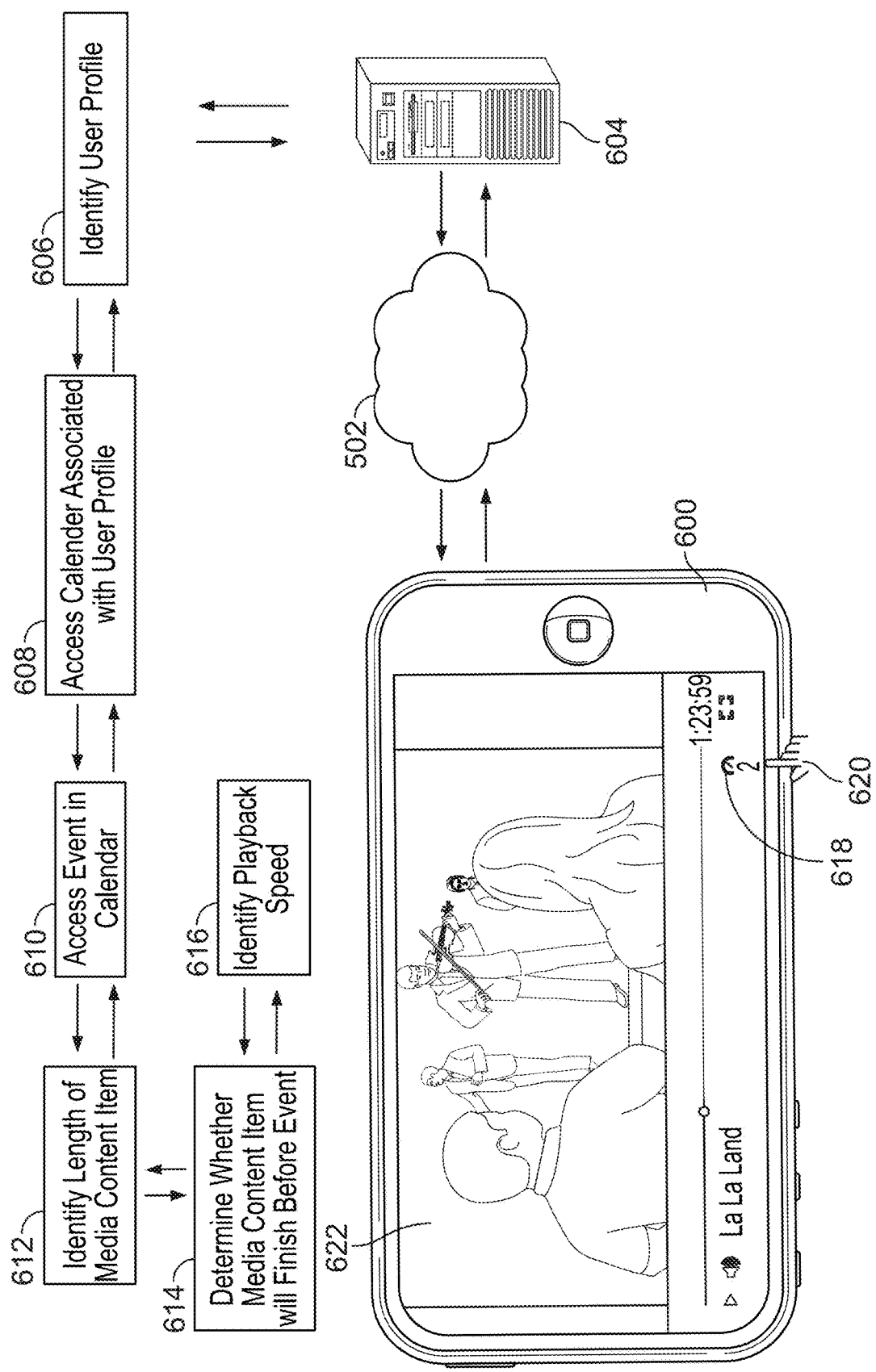
FIG. 6 shows another example environment in which the playback speed of a media player is customized, in accordance with some embodiments of the disclosure.

FIG. 6 shows another example environment in which the playback speed of a media player is customized, in accordance with some embodiments of the disclosure. In a similar manner to the environments shown in the previous figures, the environment comprises a computing device, in this case a tablet 600, that receives a media content item via a network 602 from a server 604. At the server 604, a user profile is identified 606. The user profile may be associated with an OTT account. In other examples, the user profile maybe linked to a video sharing account, for example a Google account linked to YouTube. A calendar associated with the user profile is accessed 608. For example, an online calendar, such an Outlook calendar, may be accessed. An event in the calendar is identified and accessed 610. For example, if the calendar is accessed at 8:30 on Tuesday, Sep. 15, 2021 and the next event in the calendar is 9:00 on the same day, that event is accessed. A length of the media content item is identified 612, for example one hour. It is then determined 614 whether the media content item will finish before the start of the event. In this example, as the media content item is an hour long and the event will start in 30 minutes, the media content item will finish after the start of the event. A playback speed is identified 616 that will enable the media content item to finish before the event. In this example, the identified playback speed is double the normal playback speed. The identified playback speed is transmitted from the server 604, via the network 602, to the tablet 600. At the tablet 600, the playback speed is received, and an adjustable playback speed user interface element 618 is generated for display and is displayed to the user. The adjustable playback speed user interface element 618 is preset in accordance with the identified playback speed, in this example, to double the normal playback speed. In some examples, the user interface element 618 may be the same element as the user interface element 108, 208, 308, 412, 512 shown in FIGS. 1-5, in that it appears in the same position in an application running on the tablet 100, 200, 300, 400, 500, 600 but having been adjusted to have a different preset value. This preset value may additionally be based on any combination of the aforementioned features. In other examples, the environment shown in FIG. 6 is a stand-alone environment. User input 620 is received that confirms the preset playback speed. The media content item 622 is generated for output and is output at the identified playback speed.

Figure 7:
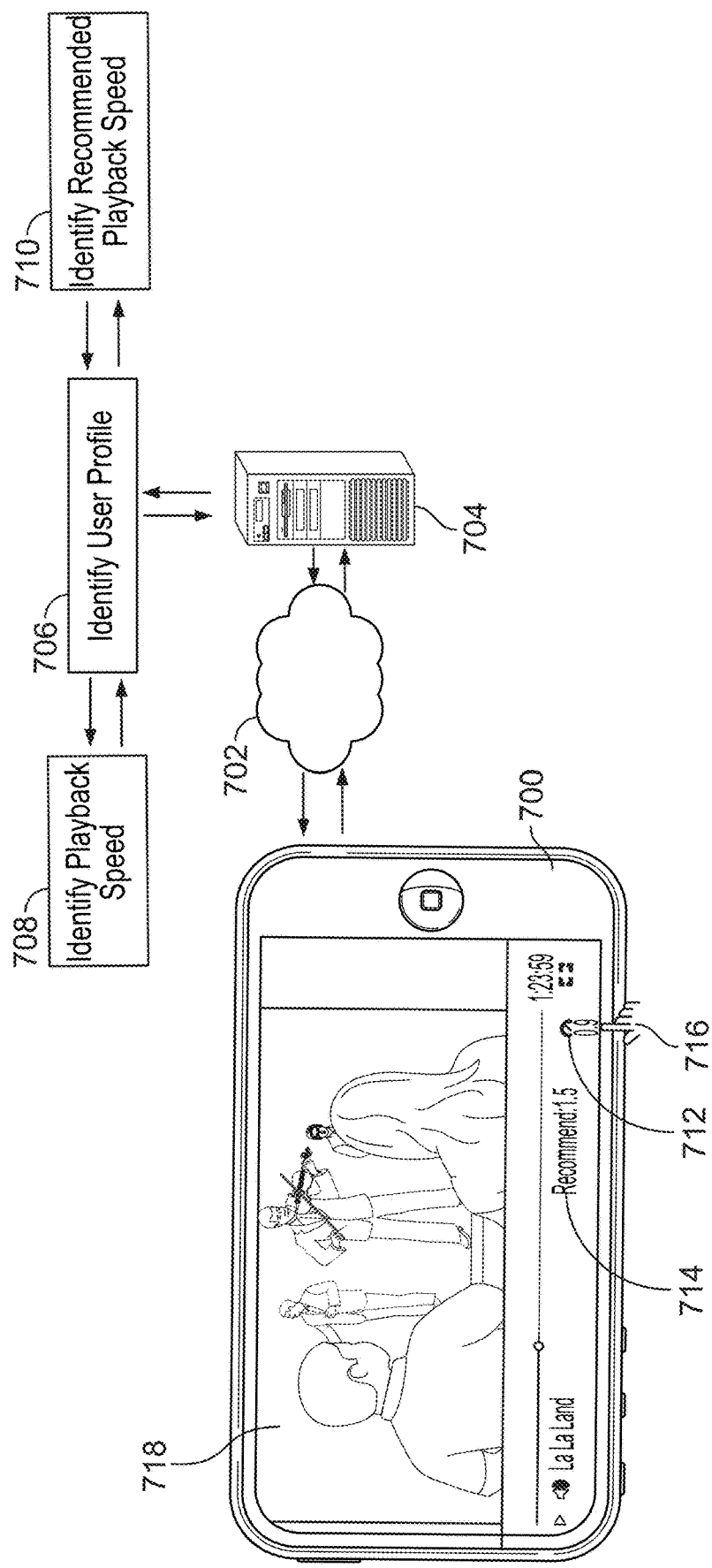
FIG. 7 shows another example environment in which the playback speed of a media player is customized, in accordance with some embodiments of the disclosure.

FIG. 7 shows another example environment in which the playback speed of a media player is customized, in accordance with some embodiments of the disclosure. In a similar manner to the environments shown in the previous figures, the environment comprises a computing device, in this case a tablet 700, that receives a media content item via a network 702 from a server 704. At the server 704, a user profile is identified 706. As discussed in connection with FIG. 4, a playback speed is identified 708 based on the identified user profile. In this example, a playback speed of 0.9 times normal playback speed is identified. The identified playback speed is transmitted from the server 704, via the network 702, to the tablet 700. At the tablet 700, the identified playback speed is received, and an adjustable playback speed user interface element 712 is generated for display and is displayed to the user. The adjustable playback speed user interface element 712 is preset in accordance with the identified playback speed, in this example, to 0.9 times normal playback speed. In some examples, the user interface element 712 may be the same element as the user interface element 108, 208, 308, 412, 512, 618 shown in FIGS. 1-6, in that it appears in the same position in an application running on the tablet 100, 200, 300, 400, 500, 600, 700 but having been adjusted to have a different preset value. This preset value may additionally be based on any combination of the aforementioned features. In other examples, the environment shown in FIG. 7 is a stand-alone environment. In addition, a recommended playback speed 710 is identified, in this example 1.5 times normal playback speed, at the server 704 and is transmitted, via the network 704, to the tablet 700. At the tablet 700, the recommended playback speed is received and is generated for display and is displayed to the user. The recommended playback speed 710 may differ from the identified playback speed. For example, the identified playback speed 708 may be based on the content of the media content item, such as if the media content item displays a type of dance that a user is interested in. However, the identified recommended playback speed 710 may be based on a calendar that is associated with the user profile, as discussed in connection with FIG. 6. The two playback speeds may conflict. By displaying a recommendation 714 in addition to the presetting the adjustable playback speed user interface element 712, the user can decide whether to override the preset playback speed. User input 716 is received that confirms the preset playback speed. The media content item 718 is generated for output and is output at the identified playback speed. The recommendation that is generated for display may comprise further information, for example "Recommend 1.5 due to event starting in 45 minutes."

In another example, the playback speed may be identified in response to information acquired from other applications running on the computing device. For example, a user may have authorized media applications, such as OTT applications, to access other applications running on the computing device, such as messaging applications, that can provide data on which the playback speed can be identified. For example, a message may read "See you in 45 minutes," and the media content item may have 50 minutes remaining. In this case, a playback speed may be identified in the manner discussed above. In another example, a media application running on a computing device can subscribe to receive such data, or events, through protocols supported by the operating system running on the computing device. In another example, a media application running on the computing device may access such data via a social network that the user belongs to, for example if the user has linked their social network account to their OTT subscription.

Figure 8:
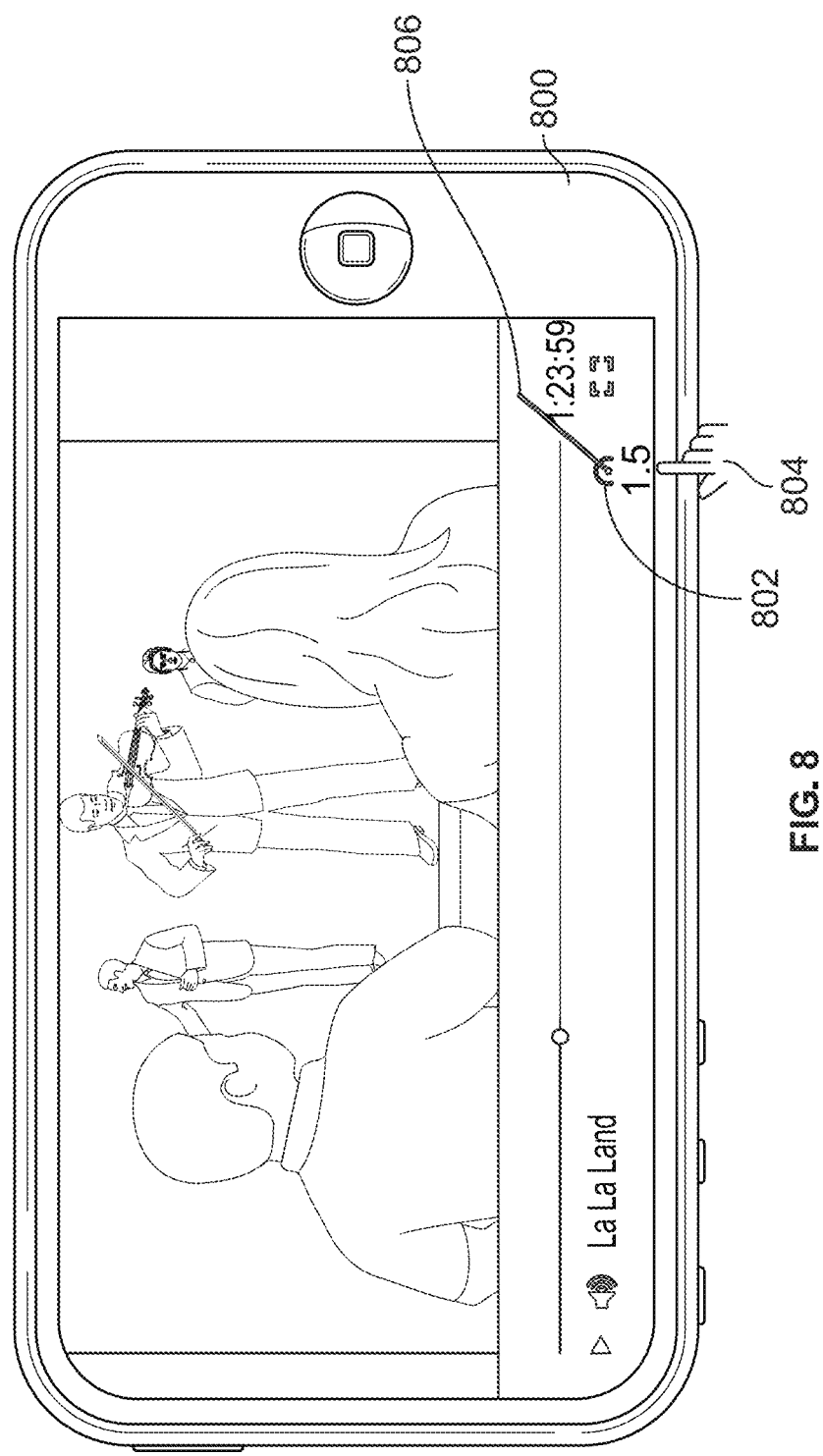
FIG. 8 shows another example environment in which the playback speed of a media player is customized, in accordance with some embodiments of the disclosure.

FIG. 8 shows another example environment in which the playback speed of a media player is customized, in accordance with some embodiments of the disclosure. In a similar manner to the environments shown in the previous figures, the environment comprises a computing device, in this case a tablet 800, that receives a media content item via a network from a server. Again, an adjustable playback speed user interface element 802 is generated for display based on an identified playback speed. As a user interacts 804 with the user interface element 802, a portion of the user interface element 802, for example a needle 806, extends in a direction away from the center of the user interface element 802. This may be advantageous where a media player running on a computing device does not have information to preset or initialize the playback speed, for example, if a user is not logged on to a user profile or if there is no historical or preference data available. In this case, the user can adjust the playback speed using, for example, a needle that extends from the playback speed icon in response to a user gesture. An advantage of such an arrangement is that it enables a user to easily control the playback speed, especially on computing devices with small screens, such as mobile computing devices. The extendable portion 806 of the user interface element may be configured to move in a stepwise, or incremental, manner and enable the user to increase and/or decrease the playback speed of the media content item. For example, the playback speed may be increased and/or decreased based on the direction of a user interaction with a computing device, such as a swipe. For example, a first swipe to the right may increase the playback speed by 0.25 times normal playback speed or any other predefined amount, such as 0.1, 0.2 or 0.5. Alternatively, when the adjustable playback speed user interface element is selected by a user, for example, via a touch event, the operating system of the computing device may only interpret any swipes on a display of the computing device as commands to control the playback speed of the media content item. This may be implemented via setting the user interface to a playback speed context. In this example, any gestures, such as tapping on the left side of the display or the right side of the display, are accepted as a command, for example to decrease or increase the playback speed of a media content item. In a similar manner, the user may be able to select a playback control for rewind and fast-forward commands that would enable a media player and/or operating system running on a computing device to interpret gestures as commands to rewind or fast-forward a media content item. The user interface 802 may replace any of the other user interface elements described herein, in that a user may be able to adjust the preset user interface element in the manner described in connection with FIG. 8.

Figure 9:
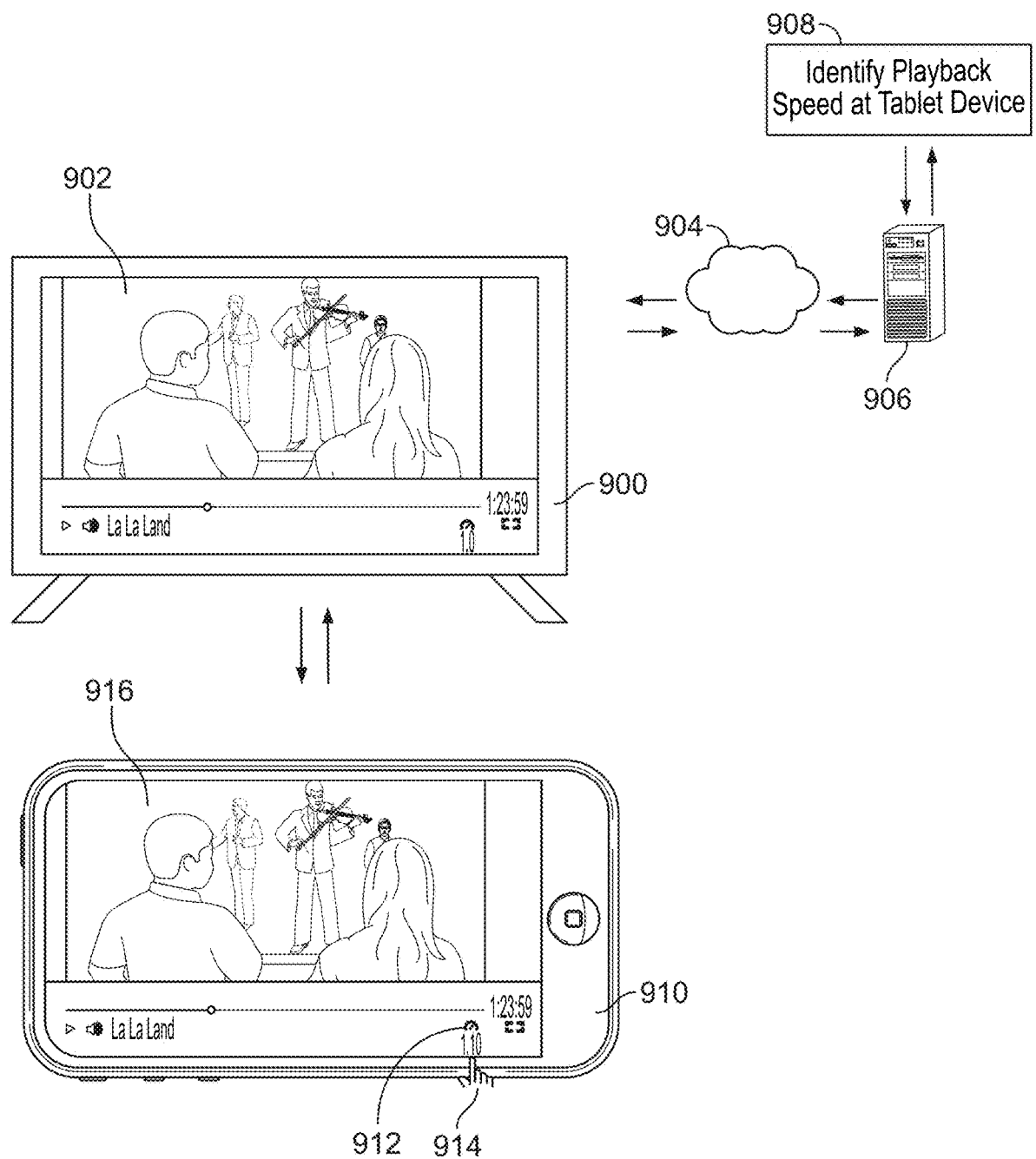
FIG. 9 shows another example environment in which the playback speed of a media player is customized, in accordance with some embodiments of the disclosure.

FIG. 9 shows another example environment in which the playback speed of a media player is customized, in accordance with some embodiments of the disclosure. The environment comprises a computing device, in this case a smart television 900, that receives a media content item 902 via a network 904 from a server 906. In this example, the media content item 902 is generated for display at the smart television 900 at a normal (i.e., 1 times) playback speed. A user watching the media content item 902 wishes to view the media content item 902 at a different playback speed. In this example, they pick up a second computing device, such as a tablet 910, an initiate a request to watch the media content item 902 at a different playback speed. For example, both the smart television 900 and the tablet 910 may have an application from an OTT provider installed. The user may initiate the request by opening the OTT application on the tablet 910 and selecting an appropriate option. On selecting the option, a request to watch the media content item 902 at a different playback speed is transmitted to the server 906. In this example, the tablet 910 is communicably connected to the smart television 900 via, for example, a home Wi-Fi network, and the command is transmitted via the smart television 900 and the network 904. At the server 906, a playback speed for the tablet device is identified, in this example 1.10 times normal playback speed. The playback speed may be identified in accordance with any of the aforementioned examples. The identified playback speed is transmitted from the server 906, via the network 904, to the tablet 910. At the tablet 910, the playback speed is received, and an adjustable playback speed user interface element 912 is generated for display and is displayed to the user. The adjustable playback speed user interface element 912 is preset in accordance with the identified playback speed, in this example, to 1.1 times the normal playback speed. In some examples, the user interface element 912 may be the same element as the user interface element 108, 208, 308, 412, 512, 618, 712, 802 shown in FIGS. 1-8, in that it appears in the same position in an application running on the tablet 100, 200, 300, 400, 500, 600, 700, 800, 910, but having been adjusted to have a different preset value. This preset value may additionally be based on any combination of the aforementioned features. In other examples, the environment shown in FIG. 9 is a stand-alone environment. User input 914 is received that confirms the preset playback speed. At the tablet 910, the media content item 916 is generated for output and is output at the identified playback speed.

Figure 10:
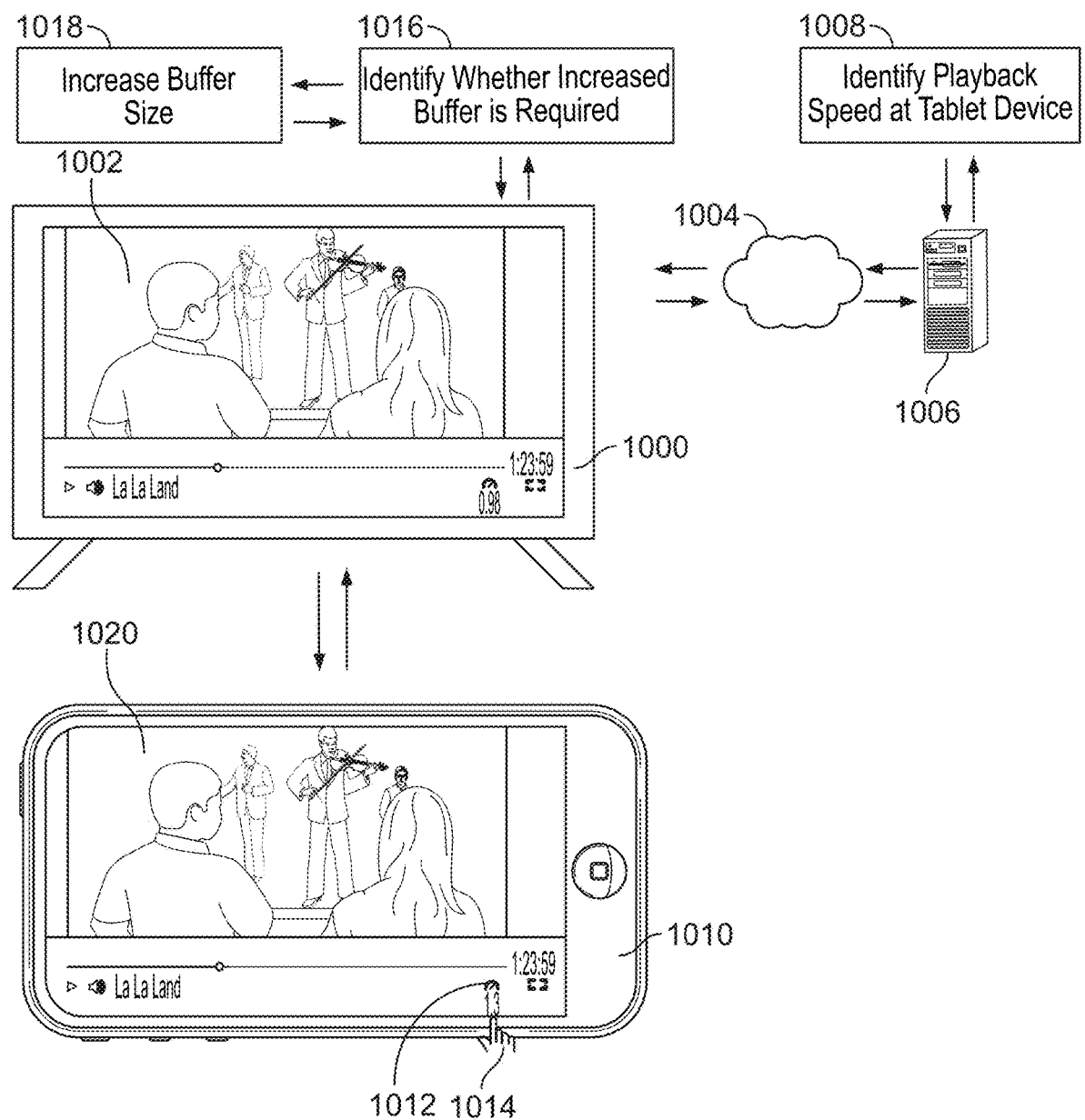
FIG. 10 shows another example environment in which the playback speed of a media player is customized, in accordance with some embodiments of the disclosure.

FIG. 10 shows another example environment in which the playback speed of a media player is customized, in accordance with some embodiments of the disclosure. In a similar manner to the environments shown in FIG. 10, the environment comprises a computing device, in this case a smart television 1000, that receives a media content item 1002 via a network 1004 from a server 1006 and a tablet 1010 that receives the media content item at a different playback speed. As before, the user may initiate the request by opening the OTT application on the tablet 1010 and selecting an appropriate option; a playback speed is identified 1008 at the server 1006; an adjustable playback speed user interface element 1012 is generated for display; and confirmation 1014 is received from a user, causing the media content item 1020 to be output for display at the identified playback speed. In some examples, the user interface element 1012 may be the same element as the user interface element 108, 208, 308, 412, 512, 618, 712, 802, 912 shown in FIGS. 1-9, in that it appears in the same position in an application running on the tablet 100, 200, 300, 400, 500, 600, 700, 800, 910, 1010, but having been adjusted to have a different preset value. This preset value may additionally be based on any combination of the aforementioned features. In other examples, the environment shown in FIG. 10 is a stand-alone environment. The media content item is transmitted from the smart television 1000 to the tablet 1010 via, for example, a home network, such as a Wi-Fi network. When a media content item 1020 is consumed via the tablet 1010, it is identified whether an increased buffer is required 1016 at the smart television 1000. For example, in cases where the identified playback speed of the media content item 1020 at the tablet 1010 is faster than the playback speed of the media content item 1002 at the smart television 1000, an increased buffer may be required, so that segments of the media content item can be delivered to the tablet 1010 at an appropriate rate. If it is identified that an increased buffer size is required, the buffer is increased 1018 at the smart television. In order to reduce the bandwidth required (from the server to the home network) to deliver a media content item at two playback speeds, the smart television 1000 may retain segments of the media content item in the buffer that have been transmitted to the tablet 1010, but not generated for display at the smart television 1000. The smart television 1000 may only have a limited storage space to increase the buffer and, for a relatively long media content item, may run out of storage space. In this case, the tablet device 1010 may switch to receiving the media content item from the server 1006, and/or the smart television may discard segments that were being stored in the buffer for display at the smart television 1000. The buffer may be of any suitable size. For example, the buffer may be of a size that enables it to hold a threshold time of the media content item or a threshold number of segments of the media content item, for example one, three or five segments. Each segment may be, for example, in the order of 2-5 MB. In this example, the buffer size may be up to 25 MB in size. In other examples, if the media content item is played back at the tablet 1010 close to the start of the media content item, the buffer size may be increased to, for example, one or two GB in order to contain a high definition media content item. The buffer may make use of an internal and/or an external storage device connected to the computing device, such as the smart television 1000.

In one example, where multiple users are watching the same media content item on, for example, an OTT application running on a smart television and/or a device connected to the smart television, a media player running on a smart television can enable any user to request faster or slower playback speed of the content on their own computing device, such as a smartphone and/or a tablet. Such a request may be for a portion of the media content item. For example, one of the users may be interested in playing back a portion of the current media content item that is being displayed via a smart television at a speed that is two times normal playback speed. In such scenario, the user may use their smartphone to initiate such a command. The smartphone and smart television may communicate data via, for example, a home Wi-Fi network, that allows an application running on the smartphone to have current state information of the media content item being played via the smart television. Such information, such as the current playback information, that is present and/or accessible through a user's smartphone may be used to invoke an OTT application on the smartphone. More specifically, the data may be used to construct a request for the media content item that is currently being played on the smart television. Since the current playback time within the content is known, the response results in essentially resuming the media content item at the smartphone and/or tablet at which the request was made. The request can also include a preferred playback speed (for example, two times normal playback speed) so that playback automatically starts at that speed. A user preference with respect to the playback speed may be a default value, or the user preference may be inputted manually via a user interface input, before the user issues a command to request a temporary break from the group watching the media content item via the smart television.

In an example, a streaming device, such as a smart television and/or a device connected to the smart television, may transmit video/audio data of a media content item to a requesting device, such as a smartphone and/or a tablet, from its own cache via a network, such as a home Wi-Fi network. The streaming device may prefetch segments of the media content item in advance to avoid a buffer underrun or rebuffering. In such case, the streaming device may transfer the buffered content to the requesting device and allow the user to play that portion of the media content item at a faster or slower speed. The streaming device may determine that there is not enough content to transfer (for example, the buffer at the streaming device may only include 10 seconds worth of content). In such scenario, the streaming device can prefetch or buffer additional content (for example, to meet a predefined buffer threshold in order to support this feature). Similarly, the streaming device can stream the content directly (for example, via Wi-Fi) to the requesting device at the specified playback speed. The streaming device may process that portion of the media content item (for example, encoding and/or transcoding the portion of the media content item) and utilize a dedicated portion of memory or buffer to support streaming to other local receiving devices, such as smartphones and/or tablets. In an example, a user might be interested in only hearing the audio of a media content item at a faster or slower speed. In this case, similar techniques can be used to stream the audio as well, either from the streaming device, such as the smart television, or as a separate independent stream from an OTT application serving the content.

Figure 11:
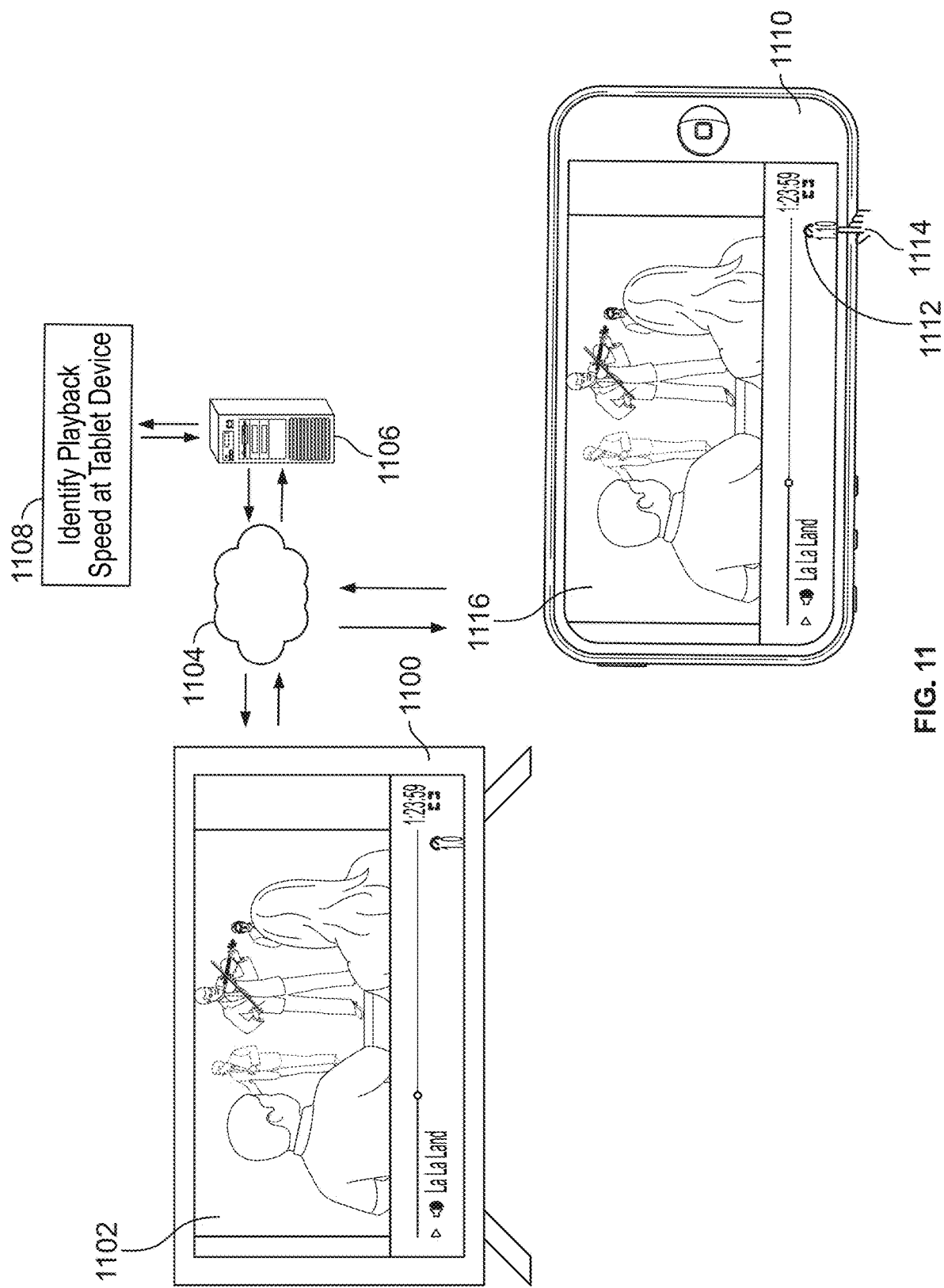
FIG. 11 shows another example environment in which the playback speed of a media player is customized, in accordance with some embodiments of the disclosure.

FIG. 11 shows another example environment in which the playback speed of a media player is customized, in accordance with some embodiments of the disclosure. In a similar manner to the environments shown in FIG. 9, the environment comprises a computing device, in this case a smart television 1100, that receives a media content item 1102 via a network 1104 from a server 1106 and a tablet 1110 that receives the media content item at a different playback speed. As before, the user may initiate the request by opening the OTT application on the tablet 1110 and selecting an appropriate option; a playback speed is identified 1108 at the server 1106; an adjustable playback speed user interface element 1112 is generated for display; and confirmation 1114 is received from a user, causing the media content item 1116 to be output for display at the identified playback speed. In some examples, the user interface element 1112 may be the same element as the user interface element 108, 208, 308, 412, 512, 618, 712, 802, 912, 1012 shown in FIGS. 1-10, in that it appears in the same position in an application running on the tablet 100, 200, 300, 400, 500, 600, 700, 800, 910, 1010, but having been adjusted to have a different preset value. This preset value may additionally be based on any combination of the aforementioned features. In other examples, the environment shown in FIG. 10 is a standalone environment. This environment differs in that the tablet device 1110 receives the media content item from the server 1106 and not via the smart television 1100. For example, the tablet device 1110 may receive the media content item 1116 for output at a different playback speed via a Wi-Fi home network. In other examples, the tablet device 1110 may receive the media content item via a cellular network.

Figure 12:
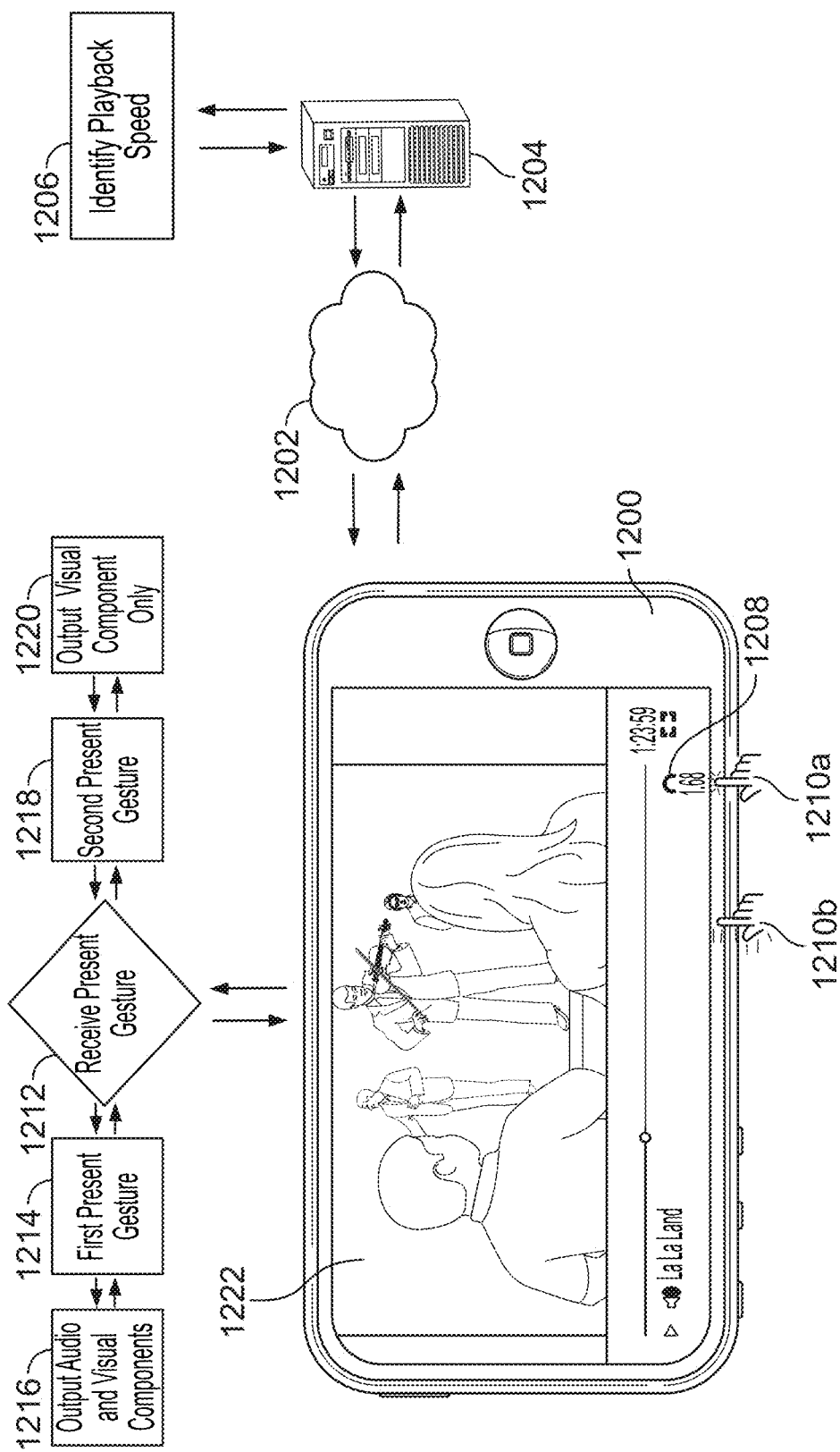
FIG. 12 shows another example environment in which the playback speed of a media player is customized, in accordance with some embodiments of the disclosure.

FIG. 12 shows another example environment in which the playback speed of a media player is customized, in accordance with some embodiments of the disclosure. The environment comprises a computing device, in this case a tablet 1200, that receives a media content item via a network 1202 from a server 1204. A playback speed is identified 1206 at the server 1204. In this example, a playback speed of 1.68 times normal playback speed is identified. The identified playback speed is transmitted from the server 1204, via the network 1202, to the tablet 1200. At the tablet 1200, the identified playback speed is received, and an adjustable playback speed user interface element 1208 is generated for display and is displayed to the user. The adjustable playback speed user interface element 1208 is preset in accordance with the identified playback speed, in this example, to 1.68 times normal playback speed. User input 1210a, 1210b is received 1212 that confirms the preset playback speed. In this example, the user input may be one of two preset gestures, for example, a single click 1210a or a single swipe 1210b. The single click 1210a corresponds to a first preset gesture, and the single swipe 1210b corresponds to a second preset gesture. On receiving a gesture, it is identified whether the gesture is a first preset gesture 1214, or a second preset gesture 1218. If the gesture is the first preset gesture 1214, both the audio and visual components 1216 of the media content item 1222 are generated for output and are output at the identified playback speed. If the gesture is the second preset gesture 1218, only the visual component 1220 of the media content item 1222 is generated for output and is output at the identified playback speed. In some examples, a user may be able to change the preset gesture via a settings section of the application that outputs the media content item, for example an application associated with an OTT provider, or a settings section of the operating system running on the computing device. In other examples, the preset gesture may be any type of gesture including, for example, a double tap. In other examples, the preset playback speed is only applied to a portion of the media content item, and the audio may only be muted for that section of the media content item. In some examples, the audio may be lowered rather than muted, and this may be indicated by, for example, a third gesture that is different from the first and second gestures.

Figure 13:
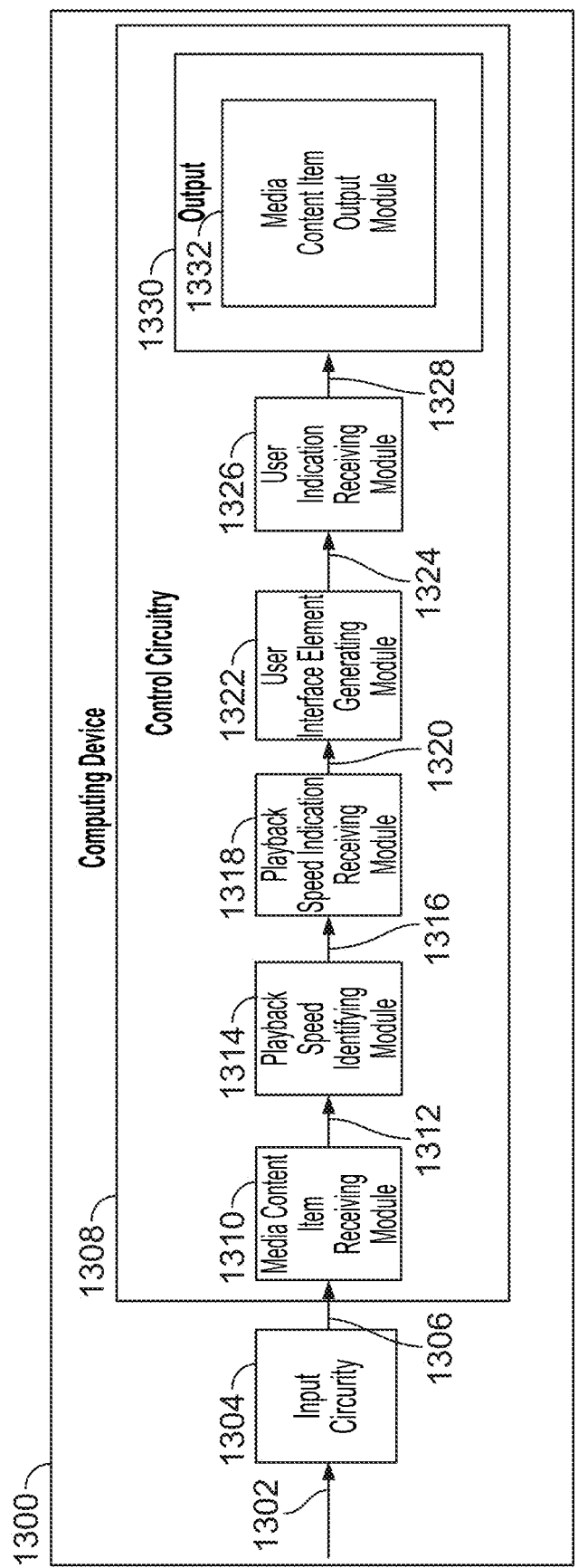
FIG. 13 shows a block diagram representing components of a computing device and data flow therebetween for customizing the playback speed of a media player, in accordance with some embodiments of the disclosure.

FIG. 13 shows a block diagram representing components of a computing device and data flow therebetween for customizing the playback speed of a media player, in accordance with some embodiments of the disclosure. Computing device 1300 (e.g., tablet device 100, 200, 300, 400, 500, 600, 700, 800, 910, 1100, 1010, 1110, 1200) as discussed above comprises input circuitry 1304, control circuitry 1308 and an output module 1330. Control circuitry 1308 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 1302, which is received by the input circuitry 1304. The input circuitry 1304 is configured to receive a user input related to a computing device. For example, this may be via a touchscreen, keyboard, mouse, microphone, infra-red controller and/or Bluetooth controller of the computing device 1300. The input circuitry 1304 transmits 1306 the user input to the control circuitry 1308.

The control circuitry 1308 comprises a media content item receiving module 1310, a playback speed identifying module 1314, a playback speed indication receiving module 1318, a user interface element generating module 1322, a user indication receiving module 1326 and an output module 1330, which comprises a media content item output module 1332. The user input is transmitted 1306 to the media content item receiving module 1310. At the media content item receiving module 1310, media content is received via, for example, the internet. On receiving the media content item, an indication is transmitted 1312 to the playback speed identifying module 1314, where a playback speed is identified in a manner as discussed in connection with the examples above. The identified playback speed is transmitted 1316 to the playback speed indication receiving module 1318. On receiving the playback speed at the playback speed indication receiving module 1318, the indicated playback speed is transmitted 1320 to user interface element generating module 1322, where the user interface element is generated for output. An indication is transmitted 1324 to the user indication receiving module 1326 and, on receiving the indication, the user indication receiving module 1326 monitors for a user input. On receiving a user input, an indication is transmitted 1328 to the output module 1330, where the media content item is generated for output, by control circuitry, at the media content item output module 1332.

Figure 14:
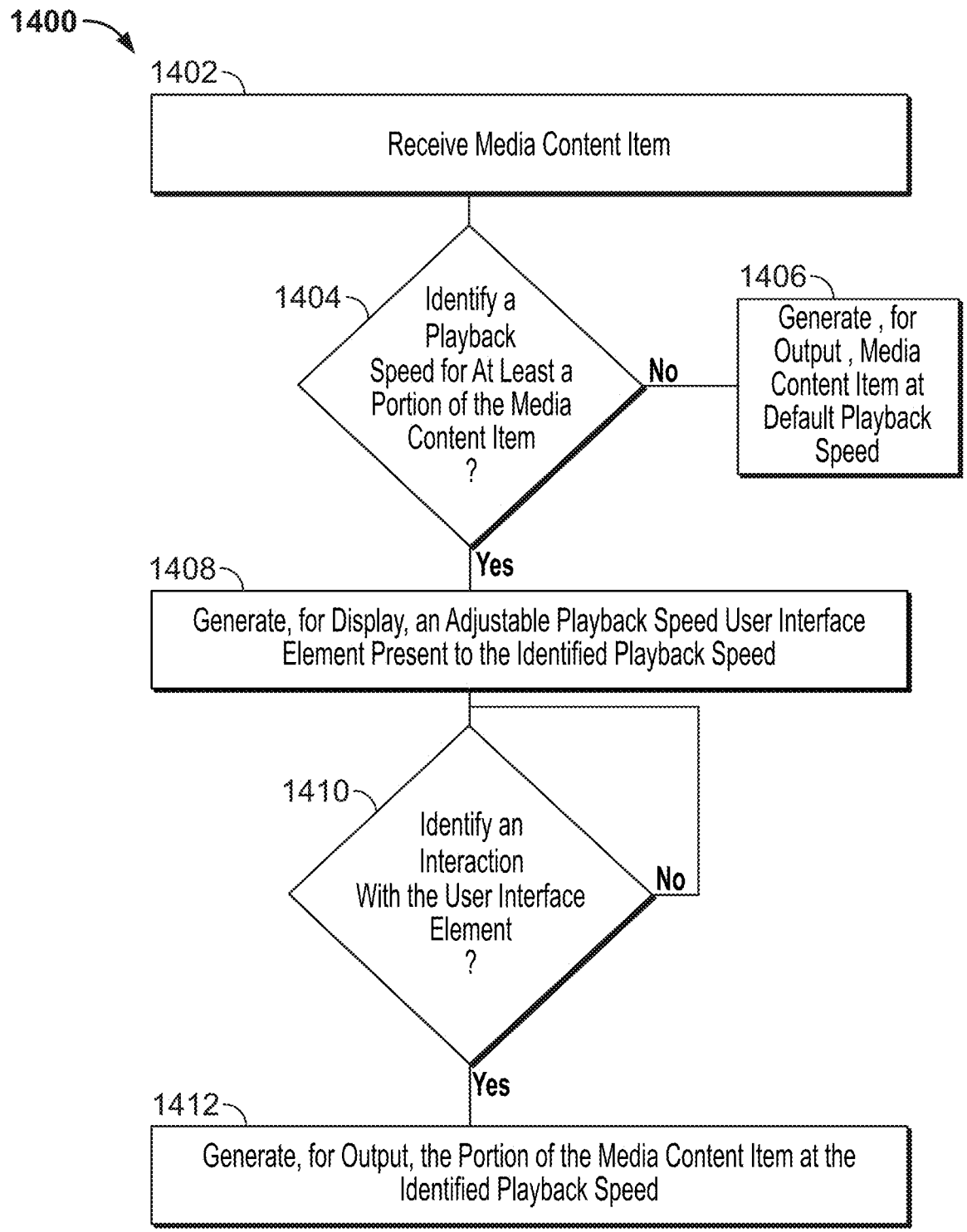
FIG. 14 shows a flowchart of illustrative steps involved in customizing the playback speed of a media player, in accordance with some embodiments of the disclosure.

FIG. 14 shows a flowchart of illustrative steps involved in customizing the playback speed of a media player, in accordance with some embodiments of the disclosure. Process 1400 may be implemented on any of the aforementioned computing devices (e.g., tablet device 100, 200, 300, 400, 500, 600, 700, 800, 910, 1100, 1010, 1110, 1200). In addition, one or more actions of the process 1400 may be incorporated into or combined with one or more actions of any other process or embodiments described herein.

At 1402, a media content item is received at a computing device. At 1404, it is determined whether a playback speed has been identified for at least a portion of the media content item 1404. If it has not, the media content item is generated for output at a default playback speed 1406, for example at normal speed. If a playback speed has been identified, then an adjustable playback speed user interface element, which is preset to the identified playback speed, is generated for display 1408. At 1410, it is identified whether there has been a user interaction with the user interface element. This action may loop until a user interaction has been identified. In some examples, not shown, the media content item may automatically start being generated for output, and output, at the identified playback speed after a preset amount of time. At 1412, on receiving an interaction with the user interface element, the portion of the media content item may be generated for output at the identified playback speed.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a media content item;
identifying a user profile that identifies play speeds for different content types and a calendar service associated with the user profile, wherein the identified play speeds are based on past selected play speeds for each of the different content types;
identifying a content type of a portion of the media content item;
identifying, based on the play speeds in the user profile and the content type, a suggested play speed for the portion of the media content item, wherein the identifying the suggested play speed further comprises:
identifying, via the calendar service, an event;
identifying a first time period based on a current time and a start time of the event;
identifying a second time period associated with the portion of the media content item;
comparing the first time period to the second time period; and
based on the second time period being longer than the first time period, identifying the suggested play speed that enables the portion of the media content item to be output within the first time period;
setting a needle for controlling a play speed of the media content item to the suggested play speed, and wherein the needle is draggable over a range of play speeds;
generating, for display, a user interface element for indicating the play speed of the media content item, and in response to a user input, the needle extending from the user interface element in a direction away from the center of the user interface element, along an axis defined by an orientation of the needle;
receiving a user interaction that either:
confirms the suggested play speed; or
selects a new play speed; and
generating, for output, the portion of the media content item at the respective suggested play speed or new play speed.

2. The method of claim 1, wherein the portion is a first portion and the media content item further comprises a second portion, the method further comprising:
identifying a second suggested play speed for the second portion of the media content item;
adjusting the needle such that the needle is set to the second suggested play speed;
identifying a second interaction with the needle; and
generating, for output, the second portion of the media content item at the second suggested play speed.

3. The method of claim 1, wherein the media content item further comprises metadata describing content of the portion of the media content item, and the method further comprises:
identifying the content type of the portion of the media content item based on the metadata.

4. The method of claim 1, further comprising:
generating a manifest file comprising the suggested play speed, wherein the manifest file indicates a plurality of media content item segments;
receiving the manifest file; and
wherein setting the needle to the suggested play speed further comprises setting the needle to the suggested play speed based on the suggested play speed in the manifest file.

5. The method of claim 1, wherein the media content item is received at a first computing device, the method further comprising:
receiving a request to receive the media content item at a second computing device, wherein:
identifying the suggested play speed further comprises identifying the suggested play speed for the media content item at the second computing device;
generating the needle further comprises generating, for display, the needle at the second computing device;
identifying an interaction with the needle at the second computing device; and
generating the portion of the media content item at the suggested play speed further comprises generating the portion of the media content item at the suggested play speed at the second computing device.

6. The method of claim 5, further comprising:
identifying a number of segments of the media content item to prefetch;
receiving the identified number of segments of the media content item at the first computing device;
storing at least a portion of the received segments in a buffer at the first computing device;
receiving a notification that the suggested play speed at the second computing device is greater than the play speed at the first computing device;
in response to receiving the notification, identifying an increased number of segments of the media content item to prefetch;
receiving the increased number of segments of the media content item at the first computing device;
storing at least the portion of the received segments in the buffer at the first computing device; and
transmitting, from the first computing device to the second computing device, at least the portion of the stored segments.

7. The method of claim 1, wherein the media content item comprises an audio component and a visual component, and identifying an interaction with the needle further comprises:
receiving a preset first interaction with the needle; or
receiving a preset second interaction with the needle; and
on receiving the preset first interaction, generating the portion of the media content item for output at the suggested play speed; or
on receiving the preset second interaction, generating only the visual component of the media content item for output at the suggested play speed.

8. The method of claim 1, wherein the portion is a first portion, the media content item further comprises a second portion and the content type is a first content type, the method further comprising:
identifying a second content type of the second portion of the media content item;
identifying, based on the play speeds in the user profile and the second content type, a second play speed for the second portion of the media content item;

resetting the needle to the second play speed; and
generating, for display, the needle at the second play speed.

9. The method of claim 1, wherein identifying the suggested play speed further comprises identifying the suggested play speed based on data received from a connected service.

10. A system comprising:
a communication port;
a memory storing instructions;
control circuitry communicably coupled to the memory and the communication port and configured to execute instructions to:
receive a media content item;
identify a user profile that identifies play speeds for different content types and a calendar service associated with the user profile, wherein the identified play speeds are based on past selected play speeds for each of the different content types;
identify a content type of a portion of the media content item;
identify, based on the play speeds in the user profile and the content type, a suggested play speed for the portion of the media content item, wherein the identifying the suggested play speed the control circuitry is further configured to execute instructions to:
identify, via the calendar service, an event;
identify a first time period based on a current time and a start time of the event;
identify a second time period associated with the portion of the media content item;
compare the first time period to the second time period; and
based on the second time period being longer than the first time period, identify the suggested play speed that enables the portion of the media content item to be output within the first time period;
setting a needle for controlling a play speed of the media content item to the suggested play speed, and wherein the needle is draggable over a range of play speeds;
control circuitry configured to generate, for display, a user interface element for indicating the play speed of the media content item, and in response to a user input, the needle extending from the user interface element in a direction away from the center of the user interface element, along an axis defined by an orientation of the needle;
receive a user interaction that either:
confirms the suggested play speed; or
selects a new play speed; and
generate, for output, the portion of the media content item at the respective suggested play speed or new play speed.

11. The system of claim 10, wherein the portion is a first portion and the media content item further comprises a second portion, the control circuitry further configured to:
identify a suggested second play speed for the second portion of the media content item;
adjust the needle, such that the needle is set to the suggested second play speed;
identify a second interaction with the needle; and
generate, for output, the second portion of the media content item at the suggested second play speed.

12. The system of claim 10, wherein:
the media content item further comprises metadata describing content of the portion of the media content item; and
the control circuitry configured to identify the content type of the portion of the media content item is further configured to identify the content type of the portion of the media content item based on the metadata.

13. The system of claim 10, wherein the system further comprises:
control circuitry configured to generate a manifest file comprising the suggested play speed, wherein the manifest file indicates a plurality of media content item segments; and
control circuitry configured to receive the manifest file; and
wherein the control circuitry configure to set the needle to the suggested play speed is further configured to set the needle to the suggested play speed based on the suggested play speed in the manifest file.

14. The system of claim 10, wherein:
the media content item is received at a first computing device;
the control circuitry is further configured to receive a request to receive the media content item at a second computing device;
the control circuitry configured to identify the suggested play speed is further configured to identify the suggested play speed for the media content item at the second computing device;
the control circuitry configured to generate the needle is further configured to generate, for display, the needle at the second computing device;
the control circuitry is further configured to identify an interaction with the needle to identify the interaction at the second computing device; and
the control circuitry configured to generate the portion of the media content item at the suggested play speed is further configured to generate the portion of the media content item at the suggested play speed at the second computing device.

15. The system of claim 14, wherein the control circuitry is further configured to:
identify a number of segments of the media content item to prefetch;
receive the identified number of segments of the media content item at the first computing device;
store at least a portion of the received segments in a buffer at the first computing device;
receive a notification that the suggested play speed at the second computing device is greater than the play speed at the first computing device;
in response to receiving the notification, identify an increased number of segments of the media content item to prefetch;
receive the increased number of segments of the media content item at the first computing device;
store at least the portion of the received segments in the buffer at the first computing device; and
transmit, from the first computing device to the second computing device, at least the portion of the stored segments.

16. The system of claim 10, wherein the media content item comprises an audio component and a visual component, and the control circuitry configured to identify an interaction with the needle is further configured to:

receive a preset first interaction with the needle; or
receive a preset second interaction with the needle; and
- on receiving the preset first interaction, the control circuitry configured to generate, for output, the portion of the media content item is further configured to output the portion of the media content item at the suggested play speed; or
- on receiving the preset second interaction, the control circuitry configured to generate, for output, the portion of the media content item is further configured to output only the visual component of the media content item at the suggested play speed.

17. The system of claim 10, wherein the portion is a first portion, the media content item further comprises a second portion and the content type is a first content type, the system further comprising:
- identifying a second content type of the second portion of the media content item;
- identifying, based on the play speeds in the user profile and the second content type of the second portion of the media content item, a second play speed for the second portion of the media content item;
- resetting the needle to the second play speed; and
- generating, for display, the needle at the second play speed.

* * * * *